(12) United States Patent
Park et al.

(10) Patent No.: US 12,672,209 B2
(45) Date of Patent: Jun. 30, 2026

(54) COOKING DEVICE HAVING MULTI-POWER STRUCTURE

(71) Applicant: SAMSUNG ELECTRONICS CO., LTD., Suwon-si (KR)

(72) Inventors: Namju Park, Suwon-si (KR); Taeho Lee, Suwon-si (KR); Yongwook Kim, Suwon-si (KR); Jungsuk Chu, Suwon-si (KR); Dongoh Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 715 days.

(21) Appl. No.: 18/113,824

(22) Filed: Feb. 24, 2023

(65) Prior Publication Data

US 2023/0209663 A1    Jun. 29, 2023

Related U.S. Application Data

(63) Continuation of application No. PCT/KR2022/018765, filed on Nov. 24, 2022.

(30) Foreign Application Priority Data

Nov. 29, 2021    (KR) ........................ 10-2021-0167729

(51) Int. Cl.
*H05B 6/06*        (2006.01)
*H02J 50/10*        (2016.01)
        (Continued)

(52) U.S. Cl.
CPC .............. *H05B 6/062* (2013.01); *H02J 50/10* (2016.02); *H02M 7/05* (2021.05); *H05B 1/0202* (2013.01);
        (Continued)

(58) Field of Classification Search
CPC .. H05B 1/0202; H05B 1/0261; H05B 1/0266; H05B 6/06; H05B 6/062; H05B 6/065;
        (Continued)

(56) References Cited

U.S. PATENT DOCUMENTS 9,692,251  B2    6/2017  Sever et al.
10,925,123  B2    2/2021  Kwack et al.
        (Continued)

FOREIGN PATENT DOCUMENTS

EP        3 678 453  A1    7/2020
EP        3 344 008  B1    9/2021
        (Continued)

OTHER PUBLICATIONS

European Search Report dated Sep. 23, 2024, in European Application No. EP 22 89 9067.
        (Continued)

*Primary Examiner* — Hung D Nguyen
(74) *Attorney, Agent, or Firm* — STAAS & HALSEY LLP

(57)        ABSTRACT

A cooking device that includes a controller configured to, after being activated, control an operation of the cooking device; a communication unit configured to, after being activated, transmit data to a wireless power transmission device; a pickup coil configured to wirelessly receive power from a transmitting coil of the wireless power transmission device; a rectification unit configured to rectify the an alternating current (AC) of the pickup coil corresponding to the power received by the pickup coil, to produce a direct current (DC); a first capacitor configured to be charged in accordance with the DC current produced by the rectification unit to activate the communication unit; and a second capacitor, having a capacitance greater than a capacitance of the first capacitor, configured to be charged in accordance
        (Continued)

with the DC current produced by the rectification unit to activate the controller, so that the communication unit is activated before the controller.

20 Claims, 23 Drawing Sheets

(51) Int. Cl.

| | | |
|---|---|---|
| *H02M 7/04* | (2006.01) | |
| *H05B 1/02* | (2006.01) | |
| *H05B 6/12* | (2006.01) | |

(52) U.S. Cl.
CPC ......... *H05B 1/0266* (2013.01); *H05B 6/1245* (2013.01)

(58) Field of Classification Search
CPC ...... H05B 6/12; H05B 6/1209; H05B 6/1236; H05B 6/1245; H05B 6/1254; H05B 2213/05; H05B 2213/06; H02J 50/05; H02J 50/10; H02J 50/12; H02J 50/40; H02J 50/80; H02J 50/90; H02M 7/05
See application file for complete search history.

(56) References Cited

U.S. PATENT DOCUMENTS

| | | | | |
|---|---|---|---|---|
| 2012/0161535 A1* | 6/2012 | Jung | .................... | H02J 50/70 307/104 |
| 2014/0139180 A1* | 5/2014 | Kim | .................... | H02J 50/80 320/108 |
| 2018/0241218 A1 | 8/2018 | Spinella | | |
| 2019/0124726 A1 | 4/2019 | Moon et al. | | |
| 2019/0394837 A1 | 12/2019 | Yun et al. | | |
| 2020/0196398 A1 | 6/2020 | Ok et al. | | |
| 2020/0260900 A1 | 8/2020 | Kim et al. | | |
| 2020/0267806 A1 | 8/2020 | Nam et al. | | |
| 2021/0100391 A1 | 4/2021 | Moon et al. | | |
| 2021/0127461 A1 | 4/2021 | Kwack et al. | | |
| 2021/0298136 A1* | 9/2021 | Moon | .................... | H05B 6/062 |
| 2022/0291889 A1 | 9/2022 | Song et al. | | |

FOREIGN PATENT DOCUMENTS

| | | |
|---|---|---|
| JP | 5830495 | 12/2015 |
| JP | 6543409 | 7/2019 |
| KR | 10-1515026 | 4/2015 |
| KR | 10-2016-0096397 | 8/2016 |
| KR | 10-1727744 | 4/2017 |
| KR | 10-2018-0080462 | 7/2018 |
| KR | 10-2019-0024546 | 3/2019 |
| KR | 10-1968553 | 4/2019 |
| KR | 10-2020-0000751 | 1/2020 |
| KR | 10-2020-0101825 | 8/2020 |
| KR | 10-2020-0101827 | 8/2020 |
| KR | 10-2194276 | 12/2020 |
| KR | 10-2233181 | 3/2021 |
| KR | 10-2436144 | 8/2022 |
| KR | 10-2022-0128216 | 9/2022 |
| WO | WO 2020/004892 A1 | 1/2020 |

OTHER PUBLICATIONS

International Search Report, PCT/ISA/210, dated Mar. 2, 2023, and Written Opinion, PCT/ISA/237, dated Mar. 2, 2023, in PCT Application No. PCT/KR2022/018765.
Office Action dated Mar. 19, 2025, issued in European Application No. 22 889 067.7.

* cited by examiner

Figure 4A:
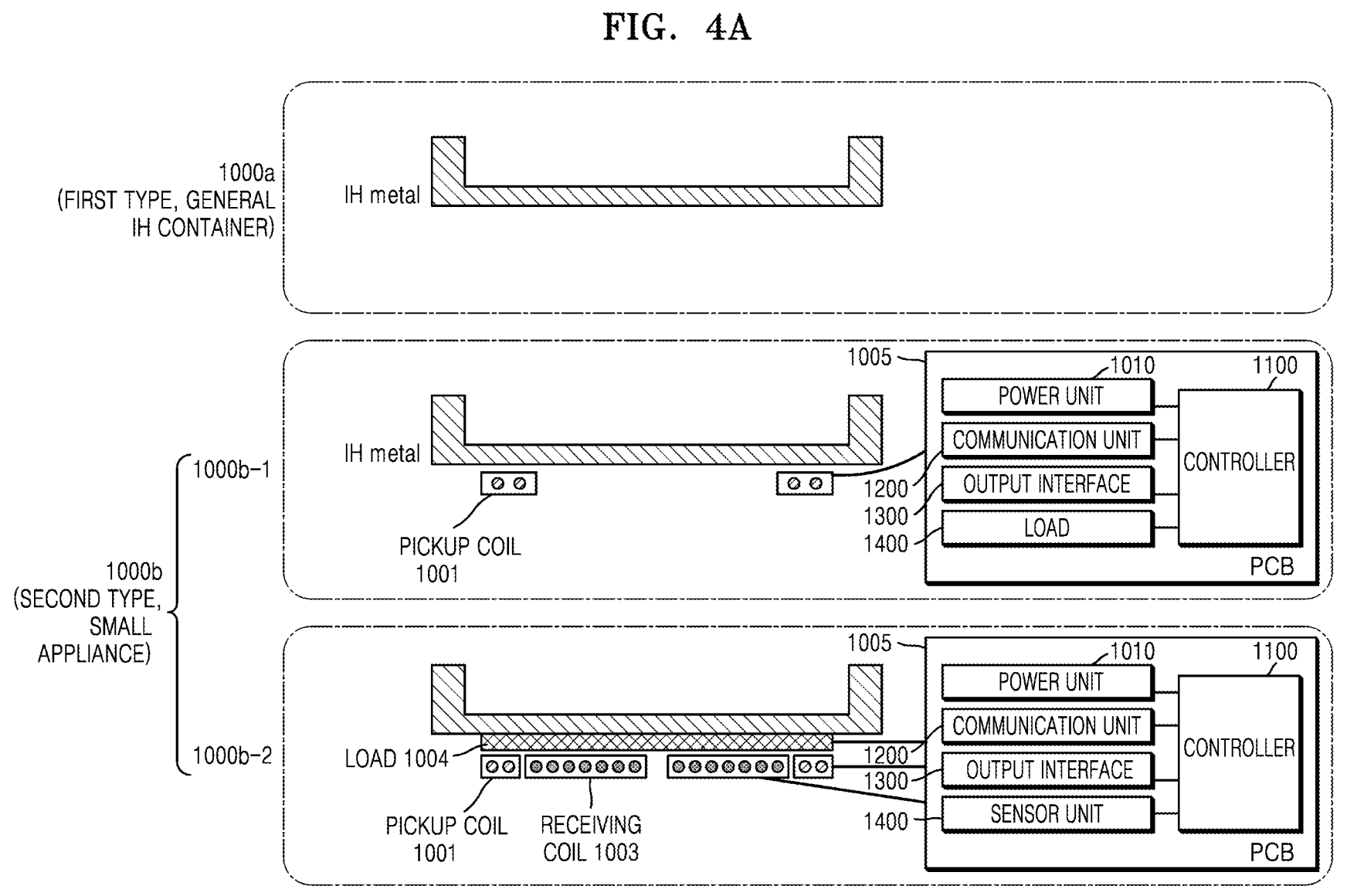

FIG. 4A 1000a
(FIRST TYPE, GENERAL IH CONTAINER)

IH metal 1000b-1

IH metal

PICKUP COIL 1001

1005

1010 POWER UNIT

1100 CONTROLLER

COMMUNICATION UNIT

OUTPUT INTERFACE

LOAD

PCB 1200
1300
1400

1000b-2

LOAD 1004

PICKUP COIL 1001

RECEIVING COIL 1003

1005

1010 POWER UNIT

1100 CONTROLLER

COMMUNICATION UNIT

OUTPUT INTERFACE

SENSOR UNIT

PCB 1200
1300
1400

1000b
(SECOND TYPE, SMALL APPLIANCE)

Figure 6:
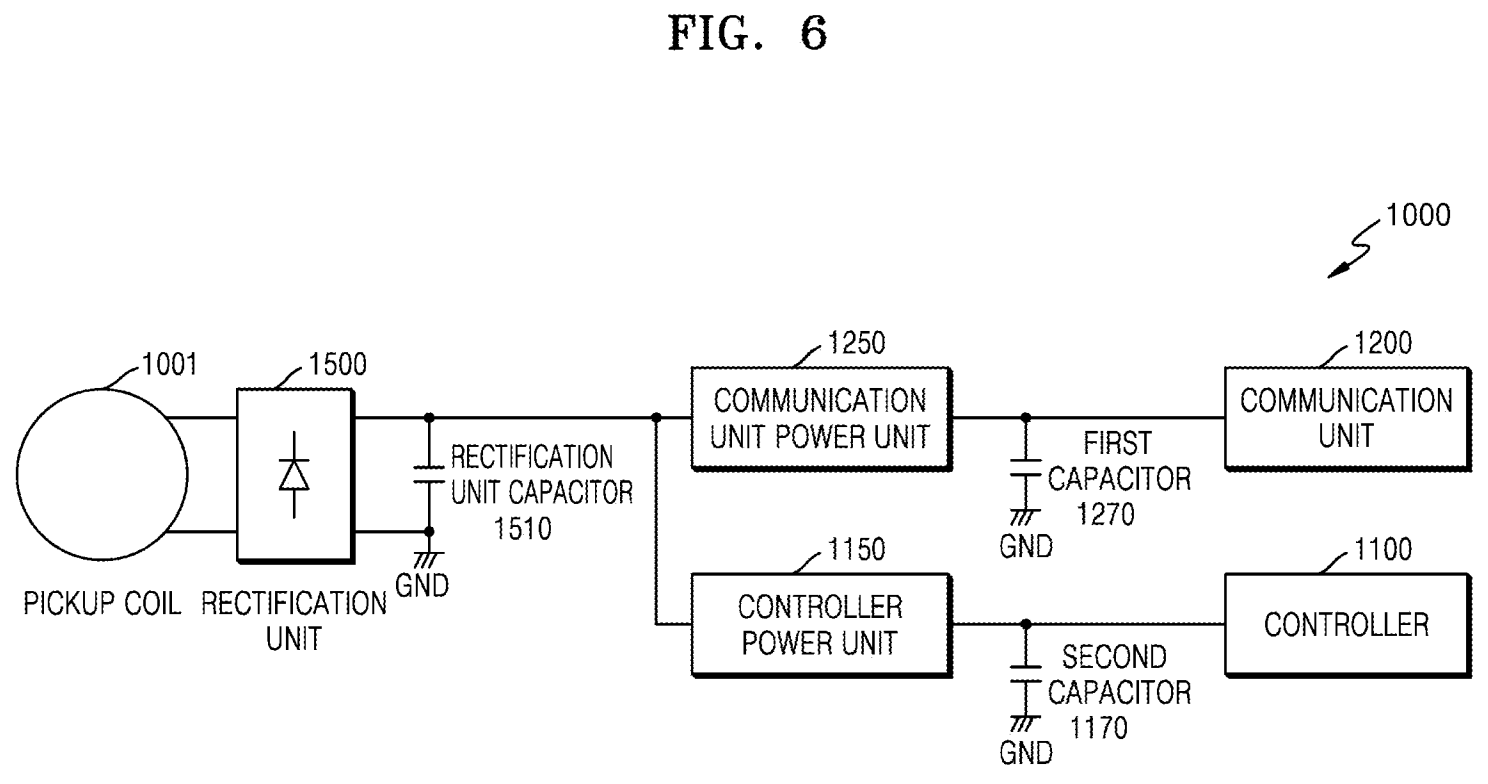

COMMUNICATION UNIT 1200

CONTROLLER 1100

FIRST CAPACITOR 1270
GND

SECOND CAPACITOR 1170
GND

COMMUNICATION UNIT POWER UNIT 1250

CONTROLLER POWER UNIT 1150

RECTIFICATION UNIT CAPACITOR 1510
GND

1500

1001

PICKUP COIL  RECTIFICATION UNIT

COOKING DEVICE HAVING MULTI-POWER STRUCTURE

CROSS-REFERENCE TO RELATED APPLICATION(S)

This application is a continuation application, under 35 U.S.C. § 111(a), of International Patent Application No. PCT/KR2022/018765, filed on Nov. 24, 2022, which is based on and claims priority under 35 U.S.C. § 119 to Korean Patent Application No. 10-2021-0167729, filed on Nov. 29, 2021, in the Korean Intellectual Property Office, the disclosures of which are hereby incorporated by reference herein in their entireties.

BACKGROUND

1. Field

The disclosure relates to a device for facilitating a quick operation of a cooking device and minimizing a power stabilizaton time, by using a multi-power structure in the cooking device.

2. Description of the Related Art

Small devices, such as smart kettles, wireless powered coffee machines, wireless powered pots, and the like, consist of a body unit and a station for wirelessly supplying power to a lower end of the body unit.

When power is wirelessly supplied from the station to the body unit, the body unit of a small device supplies single power to the entire body unit through a pickup coil for receiving power. DC power needed for a small device may be generated through a switched mode power supply (SMPS) from wireless power received through a pickup coil, or used through a capacitor after rectification.

When single power is used through a pickup coil, power stabilization of a body unit of a small device takes a long time. It is disadvantageous that, during a body unit power stabilization time, a user is unable to check any piece of information from a cooking device.

SUMMARY

Embodiments of the disclosure will be set forth in part in the description which follows and, in part, will be apparent from the description, or may be learned by practice of the presented embodiments.

Accordingly, one embodiment is directed to a cooking device that includes a controller configured to, after being activated, control an operation of the cooking device; a communication unit configured to, after being activated, transmit data to a wireless power transmission device; a pickup coil configured to wirelessly receive power from a transmitting coil of the wireless power transmission device; a rectification unit configured to rectify an alternating current (AC) of the pickup coil corresponding to the power received by the pickup coil, to produce a direct current (DC); a first capacitor configured to be charged in accordance with the DC current produced by the rectification unit to activate the communication unit; and a second capacitor, having a capacitance greater than a capacitance of the first capacitor, configured to be charged in accordance with the DC current produced by the rectification unit to activate the controller, so that the communication unit is activated before the controller.

Another embodiment is directed to the cooking device described above, further including a switch connecting the first capacitor to the second capacitor.

Yet another embodiment is directed to the cooking device described above, wherein the switch includes a diode, and the second capacitor has a positive pole connected to an anode of the diode, and the first capacitor has a positive pole connected to a cathode of the diode.

Yet another embodiment is directed to the cooking device described above, wherein the switch includes a transistor, the second capacitor has a positive pole connected to a collector of the transistor, and the first capacitor has a positive pole connected to an emitter of the transistor.

Yet another embodiment is directed to the cooking device described above, wherein the controller turns the transistor on after a time period passes.

Yet another embodiment is directed to the cooking device described above, wherein the time period is a time duration to complete charging of the second capacitor.

Yet another embodiment is directed to the cooking device described above, wherein, after the time period passes, the controller turns off a switch that is connected between the rectification unit and the first capacitor.

Yet another embodiment is directed to the cooking device described above, wherein the controller controls turning on/off of a switch that is connects the rectification unit and the first capacitor based on a charge level of the second capacitor.

Yet another embodiment is directed to the cooking device described above, wherein the communication unit transmits the data to the wireless power transmission device when a charge level of the first capacitor is equal to or greater than a value based on the activation of the communication unit.

Yet another embodiment is directed to the cooking device described above, wherein the data includes at least one of identification information of the cooking device, a welcome message when the cooking device is turned on, and status information of the cooking device, and the at least one of the identification information of the cooking device includes at least one of a Mac address, a model name, type information, manufacturer information, a serial number, and a date of manufacture of the cooking device.

Yet another embodiment is directed to the cooking device described above, including a switch connecting the rectification unit to the second capacitor that is turned off until the activation of the communication unit is complete.

Yet another embodiment is directed to the cooking device described above, wherein the switch connecting the rectification unit to the second capacitor is turned on based on completion of the activation of the communication unit.

Yet another embodiment is directed to the cooking device described above, including an output interface configured to use power from the second capacitor.

Yet another embodiment is directed to the cooking device described above, including an output interface configured to display information and a third capacitor configured to charge power from the rectification unit to activate the output interface, wherein a capacitance of the third capacitor is greater than the capacitance of the second capacitor.

Yet another embodiment is directed to the cooking device described above, including a switch connecting the second capacitor to the third capacitor.

Yet another embodiment is directed to the cooking device described above, including a switch connecting the first capacitor to the second capacitor that is turned on as the controller is activated, and wherein the switch connecting the second capacitor to the third capacitor is turned on as the output interface is activated.

Yet another embodiment is directed to the cooking device described above, that includes a switch connecting the first capacitor to the rectification unit that is turned off based on turning-on of the switch connecting the first capacitor to the second capacitor, and a switch connecting the second capacitor to the rectification unit that is turned off based on turning-on of the switch connecting the second capacitor to the third capacitor.

Yet another embodiment is directed to the cooking device described above, wherein when a voltage at both ends of the third capacitor is less than or equal to a value, the switch connecting the second capacitor to the rectification unit is turned on and, when a voltage at both ends of the second capacitor is less than or equal to a value, the switch connecting the first capacitor to the rectification unit is turned on.

Yet another embodiment is directed to the cooking device described above, wherein the cooking device is heated by an eddy current generated in the cooking device by magnetic induction of the wireless power transmission device, or is heated by a receiving coil configured to wirelessly receive power from the transmitting coil of the wireless power transmission device.

Yet another embodiment is directed to the cooking device described above, including a temperature sensor configured to sense a temperature of contents in the cooking device.

BRIEF DESCRIPTION OF DRAWINGS

These and/or other embodiments of the disclosure will become apparent and more readily appreciated from the following description of embodiments, taken in conjunction with the accompanying drawings.

FIGS. 4A, 4B, 4C, 4D, and 4E illustrate types of a cooking device according to an embodiment of the disclosure.

FIG. 6 is a circuit diagram of a cooking device using multi-power according to an embodiment of the disclosure.

FIG. 7 is a circuit diagram of a cooking device using multi-power according to an embodiment of the disclosure.

FIG. 9 is another circuit diagram of a cooking device using multi-power according to an embodiment of the disclosure.

FIG. 11 is a circuit diagram of a cooking device using triple-power according to an embodiment of the disclosure.

FIG. 13 is another circuit diagram of a cooking device using triple-power according to an embodiment of the disclosure.

DETAILED DESCRIPTION

Figure 1:
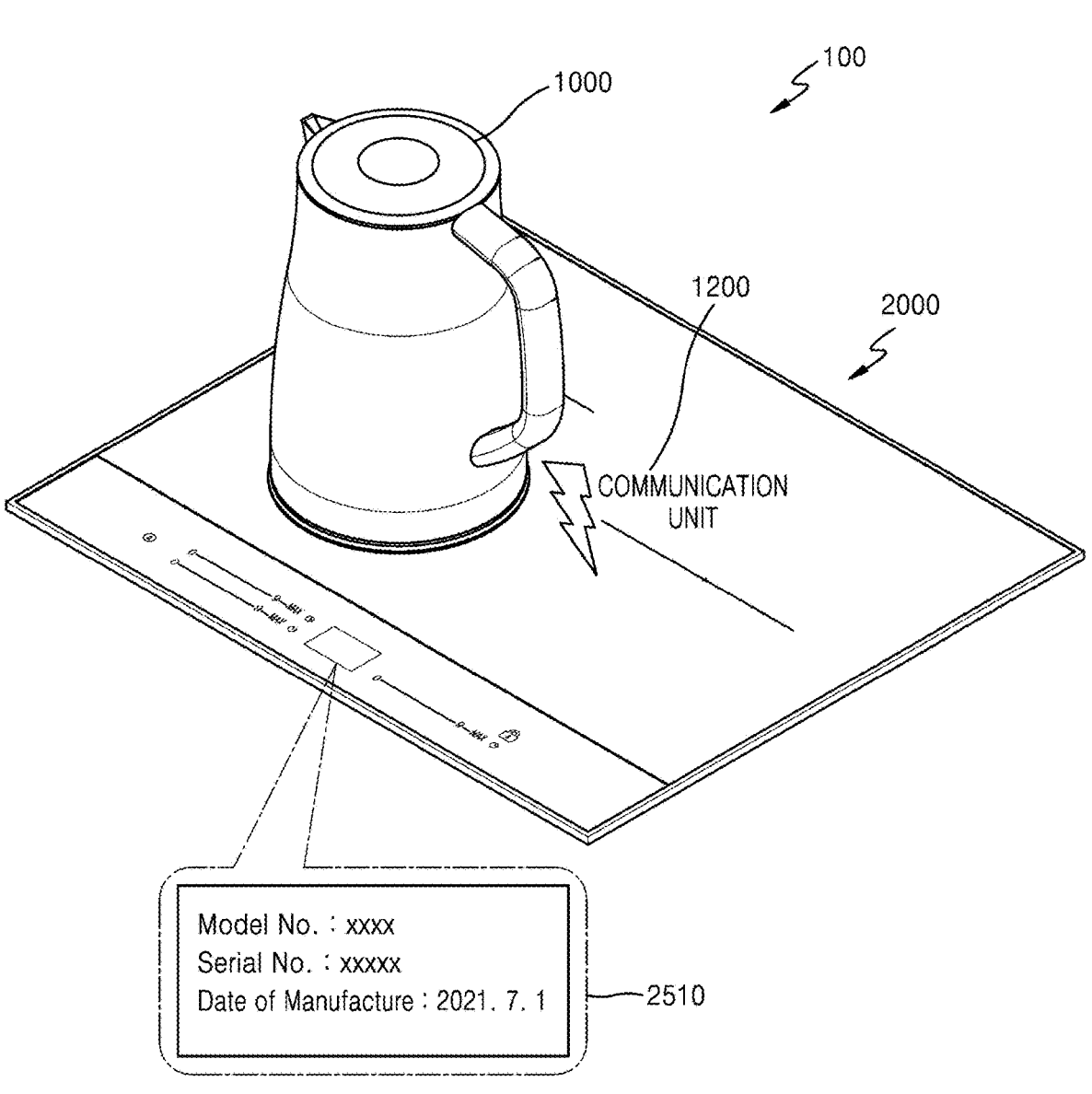
FIG. 1 illustrates a cooking system according to an embodiment of the disclosure.

Throughout the disclosure, the expression "at least one of a, b or c" indicates only a, only b, only c, both a and b, both a and c, both b and c, all of a, b, and c, or variations thereof.

The terms used in the specification are briefly described and an embodiment of the disclosure is described in detail.

The terms used in the disclosure have been selected from currently widely used general terms in consideration of the functions in the disclosure. However, the terms may vary according to the intention of one of ordinary skill in the art, case precedents, and the advent of new technologies. Furthermore, for special cases, meanings of the terms selected by the applicant are described in detail in the description section. Accordingly, the terms used in the disclosure are defined based on their meanings in relation to the contents discussed throughout the specification, not by their simple meanings.

When a part may "include" a constituent element, unless specified otherwise, it may not be construed to exclude another constituent element but may be construed to further include other constituent elements. Furthermore, terms such as " . . . portion," " . . . unit," " . . . module," and the like stated in the specification may signify a unit to process at least one function or operation and the unit may be embodied by hardware, software, or a combination of hardware and software.

The embodiment of the disclosure is described with reference to the accompanying drawings so that one skilled in the art to which the disclosure pertains can work the disclosure. However, an embodiment of the disclosure may be implemented in various difference forms and is not limited to the embodiment described herein. In the drawings, a part that is not related to a description is omitted to clearly describe the disclosure. Like references indicate like elements in the drawings.

Provided is a cooking device which can employ a multi-power structure in a receiving device of the cooking device to enable a user to check minimal information about the cooking device through a quick power stabilization of a communication unit because power stabilization takes a long time when a receiving device uses single power in a wireless power cooking device and during a power stabilization time, the user can neither use the cooking device nor check information about the cooking device.

An embodiment of the disclosure is a cooking device having a multi-power structure that includes a pickup coil configured to wirelessly receive power from a transmitting coil of a wireless power transmission device, a rectification unit configured to rectify power received from the pickup coil, a first capacitor configured to charge power from the rectification unit to activate a communication unit, and a second capacitor configured to charge power from the rectification unit to activate a controller, wherein a capacitance of the second capacitor is greater than a capacitance of the first capacitor.

Another embodiment of the disclosure is a method of driving a cooking device with multi-power that includes wirelessly receiving power from a transmitting coil of a station through a pickup coil, rectifying, by a rectification unit, power wirelessly received from the pickup coil, charging a first capacitor with power rectified by the rectification unit to activate a communication unit; and charging a second capacitor with power rectified by the rectification unit to activate a controller, wherein a capacitance of the second capacitor is greater than a capacitance of the first capacitor.

According to an embodiment of the disclosure, by previously activating a communication unit even before a controller is activated, information related to home appliances may be checked at a station in advance.

FIG. 1 illustrates a cooking system according to an embodiment of the disclosure.

Referring to FIG. 1, a cooking system 100 according to an embodiment of the disclosure may include a cooking device 1000 and a station 2000. However, not all constituent elements illustrated are essential constituent elements. The cooking system 100 may be implemented by more constituent elements than the illustrated constituent elements, and the cooking system 100 may be implemented by fewer constituent elements than the illustrated constituent elements. For example, the cooking system 100 may be implemented by the cooking device 1000, the station 2000, and a server apparatus (not shown). Throughout the specification, the cooking device 1000 may be referred to as a receiver, home appliances, or household appliances, and the terms may be used interchangeably or alternatively. The station 2000 may include a heating apparatus. Furthermore, throughout the specification, the cooking device 1000 may be household appliances that are independently sold or household appliances that are sold integrally with the station 2000.

In the following description, the configuration of the cooking system 100 is described.

According to an embodiment of the disclosure, a smart kettle is illustrated as an example of the cooking device 1000 of FIG. 1. The cooking device 1000 is a device to heat, fry, boil or otherwise provide heat to the contents therein. For example, the cooking device 1000 may include not only smart kettles, but teapots, coffee pots, pots, frypans, steamers, and the like, but the disclosure is not limited thereto. The cooking device 1000 may be induction-heated by the station 2000, and may be containers of various shapes having magnetism capable of communicating with the station 2000. The contents in the cooking device 1000 may be liquid, such as water, tea, coffee, soup, juice, wine, etc., or solid, such as butter, etc., but the disclosure is not limited thereto. In the following description, for convenience of explanation, a case in which the cooking device 1000 is a smart kettle is described as a main example.

According to an embodiment of the disclosure, the cooking device 1000 may wirelessly receive power from the station 2000 by using electromagnetic induction. Accordingly, the cooking device 1000 according to an embodiment of the disclosure may not include a power line connected to a power outlet.

According to an embodiment of the disclosure, the cooking device 1000 may be an induction-heating (IH)-type cooking device (see 1000a and 1000b-1 of FIG. 4A), or a heater-type cooking device (see 1000b-2 of FIG. 4A). IH type is a method of heating a metal material by using an electromagnetic induction phenomenon. For example, when an AC current is supplied to a transmitting coil (working coil) of the station 2000, a magnetic field that changes over time is induced in the working coil. The magnetic field generated by the transmitting coil (working coil) passes through a bottom surface of the cooking device 1000. When the magnetic field that changes over time passes through a metal, for example, iron, steel nickel, various kinds of alloys, etc., included in the bottom surface of the cooking device 1000, a current rotating around the magnetic field is generated in the metal. The rotating current is referred to as an eddy current, and a phenomenon in which a current is induced by a magnetic field that changes over time is referred to as an electromagnetic induction phenomenon. When the cooking device 1000 is an IH-type cooking device, heat is generated in the bottom surface of the cooking device 1000 due to the eddy current and the resistance of the metal, for example, iron. At this time, the generated heat may heat the contents in the cooking device 1000.

When the cooking device 1000 is a heater-type cooking device, the heater-type cooking device may include a heater and a receiving coil to drive the heater. The receiving coil of the heater-type cooking device may wirelessly receive power from the transmitting coil (working coil)of the station 2000 through a magnetic induction method, the transmitting coil (working coil)being stated as a transmitting coil in the following description. The magnetic induction method is a method of transferring energy by applying a magnetic field formed by a current flowing in the transmitting coil to the receiving coil.

The heater type may be referred to as a power receiving type in terms of wirelessly receiving power from the transmitting coil of the station 2000. Accordingly, the heater-type cooking device may be referred to as a power receiving-type cooking device. The power receiving-type cooking device may be a cooking device for heating that drives a heater disposed adjacent to the receiving coil, a coffee dripper that drives a heater disposed far, for example, 15 cm, from the receiving coil, or a device, such as a blender that drives a motor through the receiving coil. In an embodiment, power receiving-type home appliances corresponding to the heater-type cooking device may include a battery, and the battery is charged through the receiving coil by wirelessly receiving power.

The types of the cooking device 1000 are discussed below in detail with reference to FIGS. 4A to 4E.

The cooking device 1000 according to an embodiment of the disclosure may include a communication unit, or interface, 1200 capable of communicating between the station 2000 and/or an external apparatus. In the station 2000, information received through the communication unit, or interface, 1200 of the cooking device 1000 may be displayed on a display unit 2510. The communication unit, or interface, 1200 is described in detail with reference to FIG. 2.

Figure 2:
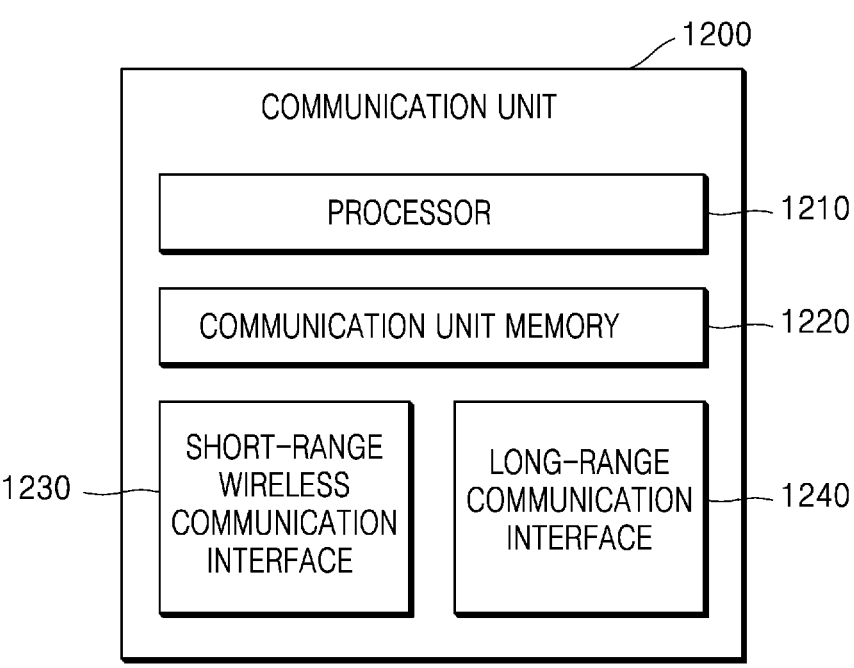
FIG. 2 is a block diagram of a communication unit of a cooking device, according to an embodiment of the disclosure.

FIG. 2 is a block diagram of the communication unit, or interface, 1200 of the cooking device 1000, according to an embodiment of the disclosure.

According to an embodiment of the disclosure, the cooking device 1000 may communicate with the station 2000 or the server apparatus through the communication unit, or interface, 1200. The communication unit, or interface, 1200 may include a processor 1210, a communication unit memory 1220, a short-range wireless communication interface 1230, a long-range communication interface 1240, and/or the like.

The processor 1210, when the power of the communication unit, or interface, 1200 is established, is configured to control the communication unit memory 1220 of the communication unit, or interface, 1200, the short-range wireless communication interface 1230, and the long-range communication interface 1240 to establish simple data transmission and reception with the station 2000. According to an embodiment of the disclosure, when power of a controller (not shown) for handling the overall control of the cooking system 100 is established, the processor 1210 may hand over, or transfer, the control of the cooking system 100 to the controller. The processor 1210 performs functions of processing or controlling other peripheral devices or units, and may be configured as any one of a CPU, a micro controller unit (MCU), and a microprocessor according to necessary performance and specifications.

The communication unit memory 1220 may store programs for processing and control of the processor 1210, pieces of data for communicating with the station 2000, for example, identification information of the cooking device 1000, a welcome message displayed when the cooking device 1000 is initially turned on, status information of the cooking device 1000, and the like. The identification information of the cooking device 1000 includes, as unique information to identify the cooking device 1000, at least one of a Mac address, a model name, device-type information, for example, an IH type or a heater type, manufacturer information, for example, manufacture ID, a serial number, or a date of manufacture (or year, month, and date of manufacture) of the cooking device 1000, but the disclosure is not limited thereto. According to an embodiment of the disclosure, the identification information of the cooking device 1000 may be expressed as a series of identification numbers or a combination of numbers and letters. When the cooking device 1000 is initially turned on, a welcome message may be text information, for example, "welcome," or when the name of a user, for example, "David," is registered on the cooking device 1000, the welcome message may be a message indicating the name of a user, for example, "Welcome! David." The status information of the cooking device 1000 may include information, such as whether the power of the controller of the cooking device 1000 has not been established yet, the cooking device 1000 has been completely prepared for cooking, or the cooking device 1000 is currently out of order and in an unavailable state, and the status information may be displayed on the display unit 2510 of the station 2000.

When the power of the communication unit, or interface, 1200 is established, at least one of pieces of data stored in the communication unit memory 1220 may be transmitted to the station 2000 under the control by the processor 1210.

The communication unit memory 1220 may include a storage medium of at least one type of a flash memory-type, a hard disk-type, a multimedia card micro-type, or a card-type memory, for example, SD or XD memory, etc., random access memory (RAM), static RAM (SRAM), read-only memory (ROM), erasable programmable ROM (EPROM), electrically erasable programmable ROM (EEPROM), programmable ROM (PROM), magnetic memory, a magnetic disk, or an optical disk.

The short-range wireless communication interface 1230 may include a Bluetooth communication unit, a Bluetooth low energy (BLE) communication unit, a near field communication (NFC) interface, a WLAN (Wi-Fi) communication unit, a Zigbee communication unit, an infrared data association (IrDA) communication unit, a Wi-Fi Direct (WFD) communication unit, an ultra-wide band (UWB) communication unit, an Ant+ communication unit, and the like, but the disclosure is not limited thereto.

The long-range communication interface 1240 may be used to communicate with the server apparatus when the cooking device 1000 is remotely controlled by the server apparatus in an Internet of things (IoT) environment. The long-range communication interface 1240 may include the Internet, a computer network, for example, a LAN or a WAN, and a mobile communication unit. The mobile communication unit may include a 3G module, a 4G module, a 5G module, an LTE module, an NB-IoT module, an LTE-M module, and the like, but the disclosure is not limited thereto.

According to an embodiment of the disclosure, the cooking device 1000 may transmit information to the server apparatus through the station 2000. For example, the cooking device 1000 may transmit, to the station 2000, information that the cooking device 1000 has, information about the cooking device 1000 or information obtained during cooking, for example, information about the temperature of the contents and the like, through short-range wireless communication, for example, Bluetooth, BLE, and the like. At this time, as the station 2000 accesses the server apparatus through a WLAN (Wi-Fi) communication unit and the long-range communication interface 1240 (the Internet), the information, for example, the information about the temperature of the contents and the like, obtained by the cooking device 1000, may be transmitted to the server apparatus. The server apparatus may provide the information obtained by the cooking device 1000 and received from the station 2000 to a user through a mobile terminal connected to the server apparatus.

The cooking device 1000 according to an embodiment of the disclosure may include a sensor unit, and the sensor unit may include a temperature sensor, an infrared sensor, a proximity sensor, a weight sensor, a geomagnetic sensor, and the like. In particular, the temperature of the contents of the cooking device 1000 may be monitored through the temperature sensor, and information about the temperature of the contents may be transmitted to the station 2000 through the communication unit, or interface, 1200. According to an embodiment of the disclosure, the cooking device 1000 may transmit, to the station 2000, the information about the temperature of the contents that is detected at regular intervals, or when a specific event occurs, for example, upon receiving a request from the station 2000. The infrared sensor or the proximity sensor may be used to determine whether the cooking device 1000 is placed on the station 2000, and the weight sensor may be used to sense the weight of the contents in the cooking device 1000. The weight sensor may be used to determine whether the contents are present in the cooking device 1000. The geomagnetic sensor may be used to sense whether the cooking device 1000 is placed appropriately.

Figure 3A:
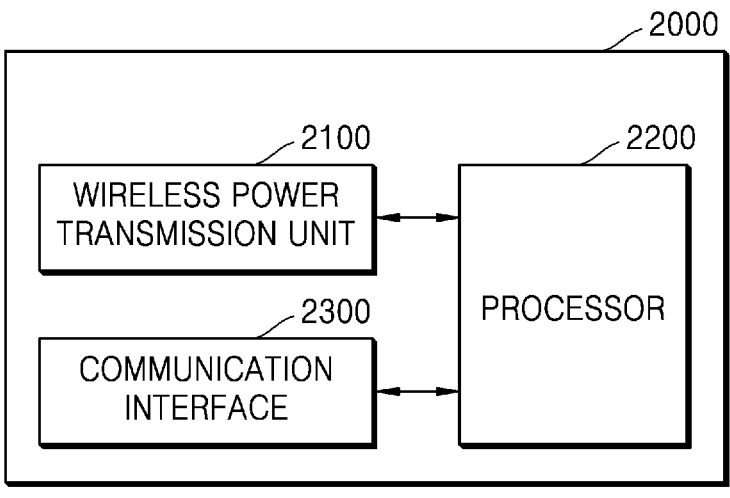
FIG. 3A is a block diagram of a station according to an embodiment of the disclosure.
Figure 3B:
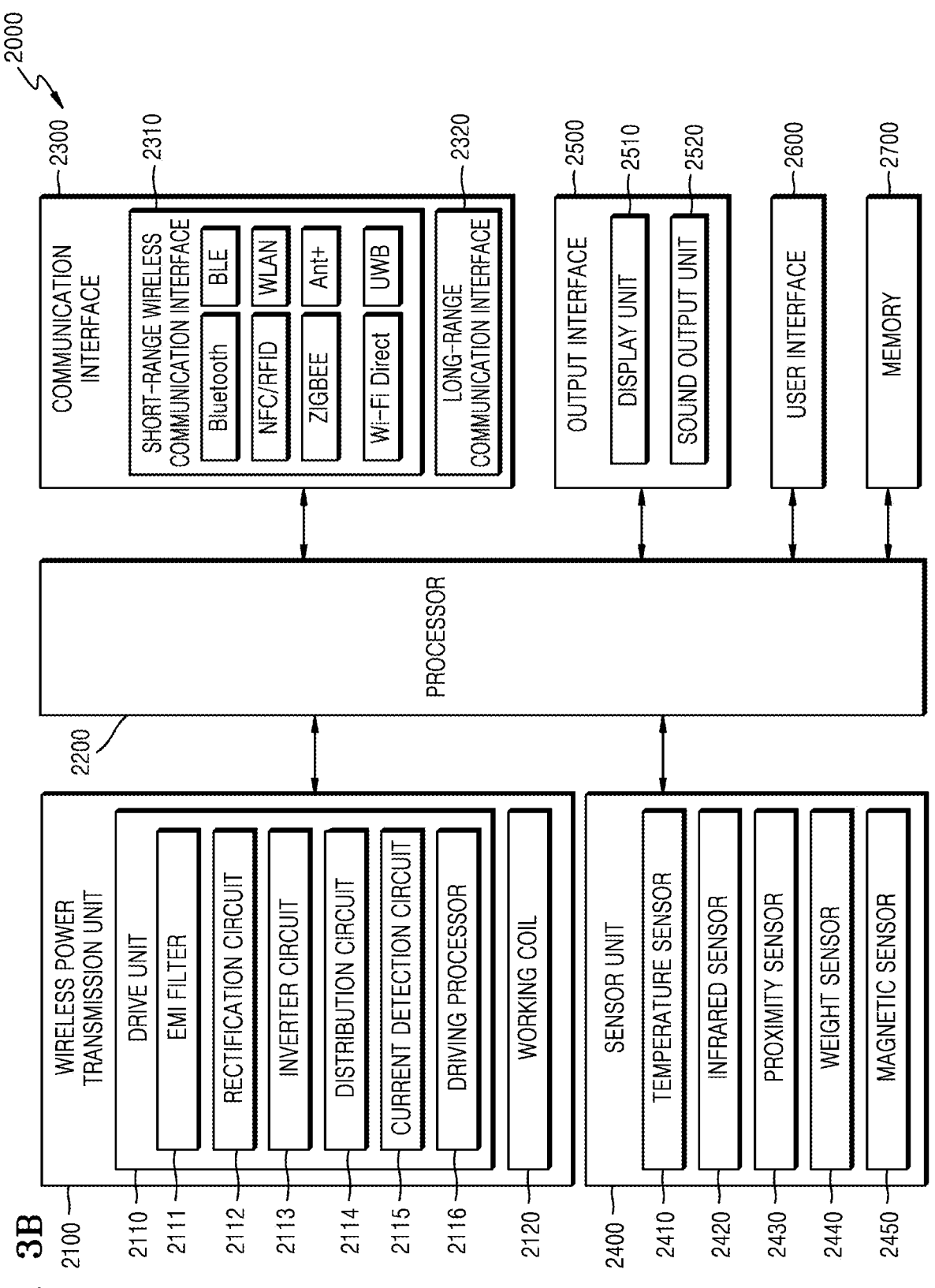
FIG. 3B is a block diagram of a station according to an embodiment of the disclosure.

FIGS. 3A and 3B are block diagrams of the station 2000 according to an embodiment of the disclosure.

As illustrated in FIG. 3A, the station 2000 according to an embodiment of the disclosure may include a wireless power transmission unit 2100, a processor 2200, and a communication interface 2300. However, not all constituent elements illustrated are essential constituent elements. The station 2000 may be implemented by more constituent elements than the illustrated constituent elements, and the station 2000 may be implemented by fewer constituent elements than the illustrated constituent elements According to an embodiment of the disclosure, the station 2000 may be an apparatus for wirelessly transmitting power to an object to be heated, for example, the cooking device 1000, located on an upper plate of the station 2000, through the wireless power transmission unit 2100 by using electromagnetic induction. The station 2000 may be expressed as an induction or electric stove. The station 2000 may include the working coil in the wireless power transmission unit 2100, the transmitting coil (working coil) generating a magnetic field to induction-heat the cooking device 1000. When the cooking device 1000 is a heater-type cooking device including a receiving coil, the working coil of the station 2000 may be expressed as a transmitting coil. According to an embodiment of the disclosure, the station 2000 may include a plurality of working coils in the wireless power transmission unit 2100. For example, when the upper plate of the station 2000 includes a plurality of cooking zones, the station 2000 may include a plurality of working coils respectively corresponding to the cooking zones. Furthermore, the station 2000 may include a high output cooking zone in which a first working coil is provided in an inner side and a second working coil is provided in an outer side. The high output cooking zone may include three or more working coils.

The upper plate of the station 2000 according to an embodiment of the disclosure may be formed of tempered glass, such as ceramic glass and the like, so as to not easily break. Furthermore, a guide mark for guiding the cooking zone where the cooking device 1000 is to be located may be formed on the upper plate of the station 2000.

According to an embodiment of the disclosure, the station 2000 may include the communication interface 2300 to communicate with an external apparatus. For example, the station 2000 may communicate with the cooking device 1000 or the server apparatus through the communication interface 2300. The communication interface 2300 of the station 2000 may include a short-range wireless communication interface, for example, an NFC interface, a Bluetooth communication unit, and the like, a long-range communication interface, and the like.

According to an embodiment of the disclosure, the station 2000 may detect the cooking device 1000 located on the upper plate, through the communication interface 2300. For example, the station 2000 may detect the cooking device 1000 located on the upper plate, using NFC communication. Furthermore, when the power of the communication unit, or interface, 1200 of the cooking device 1000 is established, the station 2000 may receive data from the cooking device 1000 by using short-range wireless communication, for example, NFC communication, Bluetooth communication, or the like. The data received from the communication unit, or interface, 1200 of the cooking device 1000 may include at least one of the identification information of the cooking device 1000, a welcome message when the cooking device 1000 is turned on, or the status information of the cooking device 1000. The identification information of the cooking device 1000 may include the Mac address, model name, device-type information, manufacturer information, serial number, date of manufacture, and the like of the cooking device 1000.

According to another embodiment of the disclosure, the station 2000 may directly transmit information obtained from the cooking device 1000 to a user's mobile terminal through device to device (D2D) communication, for example, WFD communication or BLE communication, as the long-range communication interface 1240.

The station 2000 may wirelessly transmit power to the cooking device 1000 through the wireless power transmission unit 2100 to cook the contents in the cooking device 1000. The wireless transmission of power means that power can be transmitted using a magnetic field induced in the receiving coil or a metal, metal element, for example, an iron component, by a magnetic induction method. For example, by allowing a current to flow in the working coil (transmitting coil) to form a magnetic field, the station 2000 may generate an eddy current in the cooking device 1000, or induce a magnetic field in the receiving coil.

As illustrated in FIG. 3B, the station 2000 according to an embodiment of the disclosure may include the wireless power transmission unit 2100, the processor 2200, the communication interface 2300, a sensor unit 2400, an output interface 2500, a user interface 2600, and a memory 2700.

Hereinafter, the constituent elements are discussed in sequence.

The wireless power transmission unit 2100 may include a drive unit 2110 and a working coil, also referred to as a transmitting coil, 2120, but the disclosure is not limited thereto. The drive unit 2110 may receive external power, and supply a current to the transmitting coil (working coil) 2120 according to a driving control signal of the processor 2200. The drive unit 2110 may include an electromagnetic interference (EMI) filter 2111, a rectification circuit 2112, an inverter circuit 2113, a distribution circuit 2114, a current detection circuit 2115, and a driving processor 2116, but the disclosure is not limited thereto.

The EMI filter 2111 may block high frequency noise in AC power supplied from an external source (ES), and may pass an AC voltage and AC current of a predetermined frequency, for example, 50 Hz or 60 Hz. A fuse and relay for blocking an overcurrent may be provided between the EMI filter 2111 and the ES. AC power in which high frequency noise is blocked by the EMI filter 2111 is supplied to the rectification circuit 2112.

The rectification circuit 2112 may convert the AC power to DC power. For example, the rectification circuit 2112 may convert an AC voltage having magnitude and polarity (a positive voltage or a negative voltage) that change over time, to a DC voltage having constant magnitude and polarity, and an AC current having magnitude and direction (a positive current or a negative current) that change over time to a DC current having constant magnitude and polarity. The rectification circuit 2112 may include a bridge diode. For example, the rectification circuit 2112 may include four diodes. The bridge diode may convert an AC voltage having polarity that changes over time to a positive voltage having a constant polarity, and an AC current having a direction that changes over time to a positive current having a constant direction. The rectification circuit 2112 may include a DC link capacitor. The DC link capacitor may convert a positive voltage having a magnitude that changes over time to a DC voltage having a constant magnitude.

The inverter circuit 2113 may include a switching circuit that supplies or blocks a driving current to the transmitting coil (working coil) 2120, and a resonance circuit that generates resonance with the transmitting coil (working coil) 2120. The switching circuit may include a first switch and a second switch. The first switch and the second switch may be connected in series between a plus line and a minus line output from the rectification circuit 2112. The first switch and the second switch may be turned on or off in response to a driving control signal of the driving processor 2116.

The inverter circuit 2113 may control a current supplied to the transmitting coil (working coil) 2120. For example, according to the turning on/off of the first switch and second switch included in the inverter circuit 2113, the magnitude and direction of a current flowing in the transmitting coil (working coil) 2120 may be changed. In this case, an AC current may be supplied to the transmitting coil (working coil) 2120. An AC current in the form of a sine wave is supplied to the transmitting coil (working coil) 2120 according to the switching operations of the first switch and the second switch. Furthermore, as the switching cycle of the first switch and the second switch extends, for example, the switching frequency of the first switch and the second switch decreases, the current supplied to the transmitting coil (working coil) 2120 may increase, and the intensity (the output of the station 2000) of a magnetic field output by the transmitting coil (working coil) 2120 may increase.

When the station 2000 includes a plurality of working coils as the transmitting coil (working coil) 2120, the drive unit 2110 may include the distribution circuit 2114. The distribution circuit 2114 may include a plurality of switches for passing or blocking a current to be supplied to the working coils 2120, the switches may be turned on or off according to a distribution control signal of the driving processor 2116.

The current detection circuit 2115 may include a current sensor for measuring a current output from the inverter circuit 2113. The current sensor may transmit an electrical signal corresponding to the measured current value, to the driving processor 2116.

The driving processor 2116 may determine a switching frequency (turning on/turn off frequency) of the switching circuit included in the inverter circuit 2113, based on the output intensity (power level) of the station 2000. The driving processor 2116 may generate a driving control signal to turn on/off the switching circuit according to the determined switching frequency.

The transmitting coil (working coil) 2120 may generate a magnetic field to heat the cooking device 1000. For example, when a driving current is supplied to the transmitting coil (working coil) 2120, a magnetic field may be induced around the transmitting coil (working coil) 2120. When a current, that is, an AC current, having magnitude and direction that change over time is supplied to the transmitting coil (working coil) 2120, a magnetic field having magnitude and direction that change over time may be induced around the transmitting coil (working coil) 2120. The magnetic field around the transmitting coil (working coil) 2120 may pass through the upper plate formed of tempered glass, and may reach the cooking device 1000 placed on the upper plate. Due to the magnetic field having magnitude and direction that change over time, an eddy current rotating around the magnetic field may be generated in the cooking device 1000, and electrical resistance heat may be generated by the eddy current in the cooking device 1000. The electrical resistance heat is heat that is generated in a resistor when a current flows in the resistor, which is also referred to as Joule heat. The cooking device 1000 is heated by the electrical resistance heat, and thus, the contents in the cooking device 1000 may be heated.

According to an embodiment of the disclosure, while the magnetic field generated in the transmitting coil (working coil) 2120 passes through the receiving coil, an induction current may flow in a receiving coil 1003 (see FIG. 4A) of the cooking device 1000. At this time, the cooking device 1000 may heat the contents by driving a heater that is a load 1004 (see FIG. 4A) using the power generated in the receiving coil 1003. The transmitting coil (working coil) 2120 may be expressed as a transmitting coil, compared with the receiving coil 1003 of the cooking device 1000.

The processor 2200 controls the overall operation of the station 2000. The processor 2200, by executing the programs stored in the memory 2700, may control the wireless power transmission unit 2100, the communication interface 2300, the sensor unit 2400, the output interface 2500, the user interface 2600, and the memory 2700.

According to an embodiment of the disclosure, the station 2000 may be equipped with an artificial intelligence (AI) processor. The AI processor may be manufactured in the form of an AI dedicated hardware chip, or manufactured as part of an existing general purpose processor, for example, a CPU or an application processor, or a graphics dedicated processor, for example, a GPU, and may be mounted on the station 2000.

According to an embodiment of the disclosure, the processor 2200 may perform multi-power control of the cooking device 1000 employing a multi-power structure of the cooking device 1000. Information about a multi-power control method of the cooking device 1000 may be stored in the memory 2700 of the station 2000 or a memory of the cooking device 1000, or may be obtained from an external server apparatus.

The processor 2200 may control power transmission by the wireless power transmission unit 2100 so that the temperature of the contents in the cooking device 1000 may reach a target heating temperature. For example, the processor 2200 may determine whether the temperature of the contents in the cooking device 1000 has reached the target heating temperature, based on the temperature information received from the cooking device 1000 through the communication interface 2300. When the temperature of the contents in the cooking device 1000 has reached the target heating temperature, the processor 2200 may terminate the power transmission by the wireless power transmission unit 2100. For example, the processor 2200 may control the inverter circuit 2113 to stop the supply of the driving current to the transmitting coil (working coil) 2120.

The communication interface 2300 may include a short-range wireless communication interface 2310 and a long-range communication interface 2320. The short-range wireless communication interface 2310 may include a Bluetooth communication unit, a BLE communication unit, an NFC interface, a WLAN communication unit, a Zigbee communication unit, an IrDA communication unit, a WFD communication unit, a UWB communication unit, an Ant+ communication unit, and the like, but the disclosure is not limited thereto. The long-range communication interface 2320 may transceive a wireless signal with at least one of a base station, an external terminal, or a server mobile, on a communication network. The wireless signal may include voice call signals, video call signals, or various types of data according to transceiving of text/multimedia messages. The long-range communication interface 2320 may include a 3G module, a 4G module, a 5G module, an LTE module, an NB-IoT module, an LTE-M module, and the like, but the disclosure is not limited thereto.

According to an embodiment of the disclosure, identification information, for example, a device type, a Mac address, a model name, and the like of the cooking device 1000 placed on the upper plate, may be received from the cooking device 1000 through the communication interface 2300. The communication interface 2300 may receive the information about the temperature of the contents measured in the cooking device 1000, from the cooking device 1000.

The sensor unit 2400 may be included or not depending on the function of the station 2000. The sensor unit 2400 may include various sensors including a temperature sensor 2410, an infrared sensor 2420, a proximity sensor 2430, a weight sensor 2440, and a magnetic sensor 2450.

The temperature sensor 2410 may detect the temperature of the cooking device 1000 placed on the upper plate, or the temperature of the upper plate. The cooking device 1000 is induction-heated by the transmitting coil (working coil) 2120, and may be overheated depending on a material thereof. Accordingly, the station 2000 may detect the cooking device 1000 placed on the upper plate or the temperature of the upper plate, and block the operation of the transmitting coil (working coil) 2120 when the cooking device 1000 is overheated. The temperature sensor 2410 may be installed in the vicinity of the transmitting coil (working coil) 2120. For example, the temperature sensor 2410 may be located at the exact center of the transmitting coil (working coil) 2120.

According to an embodiment of the disclosure, the temperature sensor 2410 may include a thermistor having an electrical resistance value that changes according to the temperature. For example, the temperature sensor may be a negative temperature coefficient (NTC) temperature sensor, but the disclosure is not limited thereto. The temperature sensor may be a positive temperature coefficient (PTC) temperature sensor. The infrared sensor 2420, the proximity sensor 2430, the weight sensor 2440 and the magnetic sensor 2450 may be used to determine whether the cooking device 1000 is placed on the station 2000, but the disclosure is not limited thereto.

The output interface 2500 for outputting an audio signal or a video signal may include the display unit 2510, a sound output unit 2520, and the like.

According to an embodiment of the disclosure, the station 2000 may display information related to the cooking device 1000, through the display unit 2510. For example, the station 2000 may display, on the display unit 2510, identification information, for example, an electric pot, of the cooking device 1000, which is transmitted from the communication unit, or interface, 1200 as the cooking device 1000 is detected or the power of the communication unit, or interface, 1200 of the cooking device 1000 is established.

When the display unit 2510 and a touchpad are configured as a touchscreen by forming a layer structure, the display unit 2510 may be used not only as an output device, but also as an input device. The display unit 2510 may include at least one of a liquid crystal display, a thin film transistor-liquid crystal display, a light-emitting diode (LED) display, an organic light-emitting diode display, a flexible display, a three-dimensional (3D) display, or an electrophoretic display. According to the implementation form of the station 2000, the station 2000 may include two or more display units as the display unit 2510.

The sound output unit 2520 may output audio data received from the communication interface 2300 or stored in the memory 2700. Furthermore, the sound output unit 2520 may output a sound signal related to a function performed by the station 2000. The sound output unit 2520 may include a speaker, a buzzer, and the like.

According to an embodiment of the disclosure, the output interface 2500 may output, through the display unit 2510, at least one of multi-power state information or the current temperature of the contents in the cooking device 1000. According to another embodiment of the disclosure, the output interface 2500 may output the current temperature of the contents in the cooking device 1000 by voice.

According to an embodiment of the disclosure, the output interface 2500 may display the identification information of the cooking device 1000. For example, the output interface 2500 may display on the display unit 2510 at least one of the type of the cooking device 1000, the model name of the cooking device 1000, or an icon indicating the cooking device 1000.

According to an embodiment of the disclosure, the output interface 2500 may display a current power level, an operation mode, for example, a low noise mode, a general mode, a high output mode, etc., a multi-power establishment state (communication unit power establishment completion, controller power establishment completion, display unit power being established, display unit power establishment completion), and the like.

The user interface 2600 is to receive an input from a user. The user interface 2600 may be at least one of a key pad, a dome switch, a touch pad (a contact capacitance method, a pressure resistance film method, an infrared sensing method, a surface ultrasound conduction method, an integral tension measurement method, a piezo effect method, etc.), a jog wheel, or a jog switch, but the disclosure is not limited thereto.

The user interface 2600 may include a voice recognition module. For example, the station 2000 may receive a voice signal that is an analog signal through a microphone, and convert a voice part to a computer-readable text by using an automatic speech recognition (ASR) model. The station 2000 may interpret the converted text using a natural language understanding (NLU) model to acquire the user's intention to speak. The ASR model or the NLU model may be an AI model. The AI model may be processed by an AI dedicated processor that is designed as a hardware structure specialized for processing the AI model. The AI model may be obtained through learning. Being obtained through learning may mean that as a basic AI model is learned using a number of pieces of learning data by a learning algorithm, a predefined operation rule or AI model set to perform a desired characteristic (or, purpose) is created. The AI model may consist of a plurality of neural network layers. Each of the neural network layers has a plurality of weight values, and performs a neural network operation through an operation between the operation result of the previous layer and a plurality of weight values.

Language understanding is a technology that recognizes and applies/processes human language/characters, and includes natural language processing, machine translation, dialog system, question answering, speech recognition/synthesis, and the like.

The memory 2700 may store a program for processing and control of the processor 2200, and store pieces of input/output data, for example, the identification information of the cooking device 1000, information about a temperature control method of the cooking device 1000, etc. The memory 2700 may store an AI model.

The memory 2700 may include a storage medium of at least one type of a flash memory-type, a hard disk-type, a multimedia card micro-type, or a card-type memory, for example, SD or XD memory, etc., RAM, SRAM, ROM, EPROM, EEPROM, PROM, magnetic memory, a magnetic disk, or an optical disk. Furthermore, the station 2000 may run a web storage or a cloud server that performs a storage function on the Internet.

FIGS. 4A, 4B, 4C, 4D, and 4E are views for describing the types of a cooking device according to an embodiment of the disclosure.

The cooking device 1000 may include a first type of cooking device 1000*a* that is a general IH container including a magnetic material, for example, an IH metal, and a second type of cooking device 1000*b* capable of communicating with the station 2000. The second type of cooking device 1000*b* capable of communicating with the station 2000 may be defined as a small appliance. According to an embodiment of the disclosure, the second type of cooking device 1000*b* may include a second-1 type cooking device 1000*b*-1 including an IH metal, for example, an iron component, and a second-2 type of cooking device 1000*b*-2 including the receiving coil 1003. Each of the types is described below.

The first type of cooking device 1000*a* may be induction-heated by the station 2000, and may be containers of various shapes including a magnetic material. The IH is as described above in detail with reference to FIG. 1.

The second type of cooking device 1000*b* may include a pickup coil 1001, a power unit 1010, a controller 1100, the communication unit, or interface, 1200, an output interface 1300, and a sensor unit 1400. At this time, the power unit 1010, the controller 1100, the communication unit, or interface, 1200, the output interface 1300, and the sensor unit 1400 may be mounted on a printed circuit board (PCB) 1005. The pickup coil 1001 may be referred to as a "coil for small power" or a "small power coil" for generating power to operate the PCB 1005. When power is supplied to the PCB 1005 through the pickup coil 1001, parts mounted on the PCB 1005 may be activated. For example, when power is supplied to the PCB 1005 through the pickup coil 1001, the power unit 1010, the controller 1100, the communication unit, or interface, 1200, the output interface 1300, and the sensor unit 1400 may be activated. The PCB 1005 may be described below in detail with reference to FIG. 5.

Figure 5:
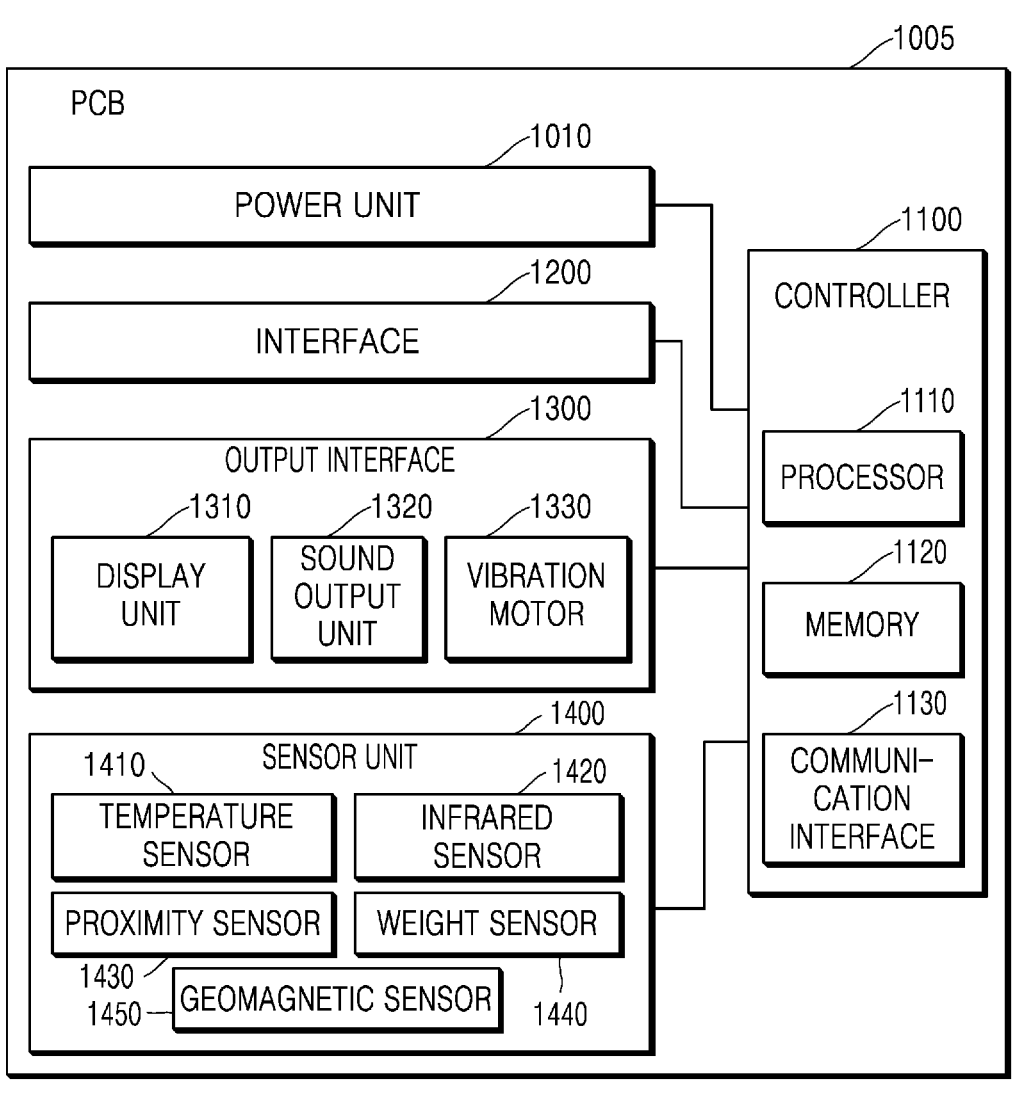
FIG. 5 is a block diagram of a PCB of a cooking device, according to an embodiment of the disclosure.

FIG. 5 is a block diagram of the PCB 1005 of a cooking device, according to an embodiment of the disclosure.

According to an embodiment of the disclosure, the PCB 1005 may include the power unit 1010, the controller 1100, the communication unit, or interface, 1200, the output interface 1300, and the sensor unit 1400.

The power unit 1010 may be a switched mode power supply (SMPS) that receives AC power from the pickup coil 1001 and supplies DC power to the controller 1100, the communication unit, or interface, 1200, the output interface 1300, and the sensor unit 1400. Furthermore, in addition to the controller 1100, the communication unit, or interface, 1200, the output interface 1300, and the sensor unit 1400, the power unit 1010 may include an inverter and/or a converter for supplying AC or DC power, not in the form of commercial AC power, when other components of the second type cooking device 1000*b* need power.

The power unit 1010 may include a rectification unit (rectification circuit) that converts AC power to DC power. The rectification unit may convert an AC voltage having magnitude and polarity (a positive voltage or a negative voltage) that change over time, to a DC voltage having constant magnitude and polarity, and an AC current having magnitude and polarity (a positive voltage or a negative voltage) that change over time, to a DC current having a constant magnitude and polarity. The rectification unit may include a bridge diode. The bridge diode may convert an AC voltage having polarity that changes over time to a positive voltage having a constant polarity, and an AC current having a direction that changes over time to a positive current having a constant direction. The rectification unit may include a DC link capacitor. The DC link capacitor may smooth a positive voltage having a magnitude that changes over time to a DC voltage having a constant magnitude. An inverter connected to the DC link capacitor may generate AC power of various frequencies and magnitudes needed by the second type cooking device 1000*b*, and a converter connected to the DC link capacitor may generate DC power of various magnitudes needed by the second type cooking device 1000*b*.

The controller 1100 may include at least one processor 1110, a memory 1120, and a communication interface 1130.

The processor 1110 controls the overall operation of the second type cooking device 1000*b*. For example, the processor 1110 included in the controller 1100 may control the power unit 1010, the communication unit, or interface, 1200, the output interface 1300, the sensor unit 1400, and the like.

According to an embodiment of the disclosure, the controller 1100 may identify a current location of the second type cooking device 1000*b* by detecting a power transmission pattern of power received from the station 2000 through the power unit 1010. For example, the controller 1100 may determine to which cooking zone the detected power transmission pattern belongs, by comparing power transmission patterns for each pre-stored cooking zone with the detected power transmission pattern. At this time, the second type cooking device 1000*b* may further include a voltage sensor for detecting a power transmission pattern.

The controller 1100 may control the communication unit, or interface, 1200 to transmit or receive data. For example, the controller 1100 may control the communication unit, or interface, 1200 to transmit, to the station 2000, at least one of identification information of the second type cooking device 1000*b*, position information of the second type cooking device 1000*b*, or communication connection information of the second type cooking device 1000*b*.

According to an embodiment of the disclosure, the controller 1100 may control the sensor unit 1400. The sensor unit 1400 may include various sensors, for example, a temperature sensor 1410, an infrared sensor 1420, a proximity sensor 1430, a weight sensor 1440, a geomagnetic sensor 1450, and the like, but the disclosure is not limited thereto. For example, the controller 1100 may measure a temperature of the contents in the second type cooking device 1000*b*, and control the temperature sensor 1410 to transmit a measurement result to the controller 1100. Furthermore, the controller 1100 may control the temperature sensor 1410 to monitor the temperature of the contents at regular intervals. The controller 1100 may control the communication unit, or interface, 1200 to transmit the information about the temperature of the contents to the station 2000 through short-range wireless communication. Depending on an implementation example, the first type cooking device 1000*a* may not include the sensor unit 1400.

The processor 1110 of the controller 1100 may control a switching element of the second type cooking device 1000*b*. The processor 1110 may control the communication interface 1130 and the communication unit, or interface, 1200 to transmit or receive data. The processor 1110 may control the output interface 1300 to output information.

The communication interface 1130 may include one or more constituent elements, which enable communication between the second type cooking device 1000*b* and the station 2000, between the second type cooking device 1000*b* and a server apparatus (not shown), between the second type cooking device 1000*b* and a mobile terminal (not shown), and between the second type cooking device 1000*b* and other home appliances. For example, the communication interface 1130 may include a short-range wireless communication interface, a long-range communication interface, and the like. According to an embodiment, the functions of the communication interface 1130 may be replaced by the communication unit, or interface, 1200, and thus, the communication interface 1130 may be omitted in the controller 1100.

The communication interface 1130 may include a short-range wireless communication interface and a long-range communication interface. The short-range wireless communication interface may include a Bluetooth communication unit, a BLE communication unit, an NFC interface, a WLAN communication unit, a Zigbee communication unit, an IrDA communication unit, a WFD communication unit, a UWB communication unit, an Ant+ communication unit, and the like, but the disclosure is not limited thereto. The long-range communication interface may be used to communicate with the server apparatus when the second type cooking device 1000*b* is remotely controlled by the server apparatus in an IoT environment. The long-range communication interface may include the Internet, a computer network, for example, a LAN or a WAN, and a mobile communication unit. The mobile communication unit may include a 3G module, a 4G module, a 5G module, an LTE module, an NB-IoT module, an LTE-M module, and the like, but the disclosure is not limited thereto. Depending on an implementation example, the first type cooking device 1000*a* may be used by replacing the communication interface 1130 with the communication unit, or interface, 1200.

The memory 1120 may store program commands to operate the second type cooking device 1000*b*, information about the second type cooking device 1000*b*, cooking information, and the like. The memory 1120 may include a storage medium of at least one type of a flash memory-type, a hard disk-type, a multimedia card micro-type, or a card-type memory, for example, SD or XD memory, etc., RAM, SRAM, ROM, EPROM, EEPROM, PROM, magnetic memory, a magnetic disk, or an optical disk. The programs stored in the memory 1120 may be classified into a plurality of modules according to the functions thereof. The memory 1120 may store at least one AI model.

According to an embodiment of the disclosure, power may be established in the communication unit, or interface, 1200 earlier than, or prior to, the controller 1100, the output interface 1300, and the sensor unit 1400. When the power is established in the communication unit, or interface, 1200 before being established in the controller 1100, the output interface 1300, and the sensor unit 1400, the information about the second type cooking device 1000*b*, stored in the communication unit memory 1220, may be transmitted to the station 2000 under the control by the processor 1210 in the communication unit, or interface, 1200. When the power of the controller 1100 is established, according to an embodiment of the disclosure, the processor 1210 may hand over, or transfer, the control of the second type cooking device 1000*b* to the controller 1100. The processor 1110 of the controller 1100 controls the overall operation of the second type cooking device 1000*b*, based on the hand-over control. This is an embodiment, and the processor 1210 may perform a necessary control operation for the second type cooking device 1000*b* before the power establishment of the controller 1100, and when the power of the controller 1100 is established, the processor 1110 of the controller 1100 and the processor 1210 of the communication unit, or interface, 1200 may each control the second type cooking device 1000*b* by dividing the roles.

The communication unit, or interface, 1200 may include one or more constituent elements that enable communication between the second type cooking device 1000*b* and the station 2000, between the second type cooking device 1000*b* and the server apparatus, or between the second type cooking device 1000*b* and the mobile terminal. For example, the communication unit, or interface, 1200 may include a short-range wireless communication interface, a long-range communication interface, and the like.

The short-range wireless communication interface may include a Bluetooth communication unit, a BLE communication unit, an NFC interface, a WLAN communication unit, a Zigbee communication unit, an IrDA communication unit, a WFD communication unit, a UWB communication unit, an Ant+ communication unit, and the like, but the disclosure is not limited thereto. The long-range communication interface may be used to communicate with the server apparatus when the second type cooking device 1000*b* is remotely controlled by the server apparatus in an IoT environment. The long-range communication interface may include the Internet, a computer network, for example, a LAN or a WAN, or a mobile communication unit. The mobile communication unit may include a 3G module, a 4G module, a 5G module, an LTE module, an NB-IoT module, an LTE-M module, and the like, but the disclosure is not limited thereto.

According to an embodiment of the disclosure, the second type cooking device 1000*b* may transmit information to the server apparatus through the station 2000. For example, the second type cooking device 1000*b* may transmit information, for example, information about the temperature of the contents, device information of a cooking device, date of manufacture, serial number, etc., obtained from the second type cooking device 1000*b*, to the station 2000, through the short-range wireless communication, for example, Bluetooth, BLE, etc. At this time, as the station 2000 accesses the server apparatus through a WLAN communication unit and the long-range communication interface (the Internet), the information, for example, information about the temperature of the contents, device information of a cooking device, date of manufacture, serial number, etc., obtained from the second type cooking device 1000*b*, may be transmitted to the server apparatus. Moreover, the server apparatus may provide a user with the information received from the station 2000 and obtained by the second type cooking device 1000*b* through a mobile terminal connected to the server apparatus. According to another embodiment of the disclosure, the station 2000 may directly transmit the information obtained from the second type cooking device 1000*b* to a user's mobile terminal through D2D communication, for example, WFD communication or BLE communication.

The output interface 1300 may be in charge of outputting a video signal or an audio signal of the first type cooking device 1000*a*. The output interface 1300 may include a display unit 1310, a sound output unit 1320, a vibration motor 1330, and the like.

When the display unit 1310, which may include a touchpad (not shown), is configured as a touchscreen by forming a layer structure, the display unit 1310 may be used not only as an output interface, but also as an input interface. The display unit 1310 may include at least one of a liquid crystal display unit, a thin film transistor-liquid crystal display unit, an organic light-emitting diode display unit, a flexible display unit, a 3D display unit, or an electrophoretic display unit. The second type cooking device 1000*b* may include two or more display units depending on the implementation form.

The sound output unit 1320 may output audio data received through the communication interface 1130 or stored in the memory 1120. For example, the sound output unit 1320 may output a sound signal related to the function performed in the second type cooking device 1000b, for example, notification sound, guidance voice, audio data about a target heating temperature, audio data about a current temperature of contents, or audio data about a multi-power state. Depending on an implementation example, the second type cooking device 1000b may not include the sound output unit 1320.

The output interface 1300 may further include a lighting device, for example, an LED. For example, the output interface 1300 may display the multi-power state of the second type cooking device 1000b by using an LED lamp.

Moreover, not all constituent elements illustrated in FIG. 5 are essential constituent elements. The PCB 1005 may be implemented by more constituent elements than the illustrated constituent elements, and the PCB 1005 may be implemented by fewer constituent elements than the illustrated constituent elements. For example, the PCB 1005 may be implemented with only the controller 1100 and the communication unit, or interface, 1200 by omitting the communication interface 1130. Furthermore, the PCB 1005 may be configured only by the controller 1100, the communication unit, or interface, 1200, and the output interface 1300. Furthermore, the second type cooking device 1000b including a user interface for receiving a user input, battery, and the like, in addition to the PCB 1005 may further include the controller 1100, the communication unit, or interface, 1200, the output interface 1300, and the sensor unit 1400.

According to an embodiment of the disclosure, when the PCB 1005 includes a user interface, a user may set or change, through user interface, a multi-power control method of the second type cooking device 1000b.

According to an embodiment of the disclosure, when the second type cooking device 1000b includes a battery, the battery may be used as auxiliary power. For example, when the second type cooking device 1000b provides a heat insulation function, the second type cooking device 1000b may continuously operate the second type cooking device 1000b by using the power of a battery even when the power transmission from the station 2000 is interrupted.

According to an embodiment of the disclosure, when the second type cooking device 1000b includes a battery, the battery may be used as auxiliary power. For example, when the second type cooking device 1000b provides a heat insulation function, the second type cooking device 1000b may monitor the temperature of the contents by using the power of a battery even when the power transmission from the station 2000 is interrupted. When the temperature of the contents decreases below a threshold temperature, the second type cooking device 1000b may transmit a notification to the mobile terminal or request power transmission from the station 2000, by using the power of a battery.

Furthermore, before receiving power from the station 2000, the second type cooking device 1000b may drive the communication unit, or interface, 1200 by using the power of a battery, and transmit a wireless communication signal to the station 2000, so that the station 2000 may recognize in advance the second type cooking device 1000b. The battery may include secondary batteries, for example, lithium ion batteries, nickel cadmium batteries, polymer batteries, nickel hydrogen batteries, etc., super capacitors, and the like, but the disclosure is not limited thereto. A super capacitor, which is a capacitor with a very large capacitance, may be referred to as an ultra-capacitor or a super high capacity capacitor.

According to an embodiment of the disclosure, when the second type cooking device 1000b includes a memory, the memory may store programs for processing and control of a processor, input/output data, for example, information about a power transmission pattern for each cooking zone, identification information of the second type cooking device 1000b, etc.

The memory may include a storage medium of at least one type of a flash memory-type, a hard disk-type, a multimedia card micro-type, or a card-type memory, for example, SD or XD memory, etc., RAM, SRAM, ROM, EPROM, EEPROM, PROM, magnetic memory, a magnetic disk, or an optical disk. The programs stored in the memory may be classified into a plurality of modules according to the functions thereof. The memory may store at least one AI model.

Figure 4B:
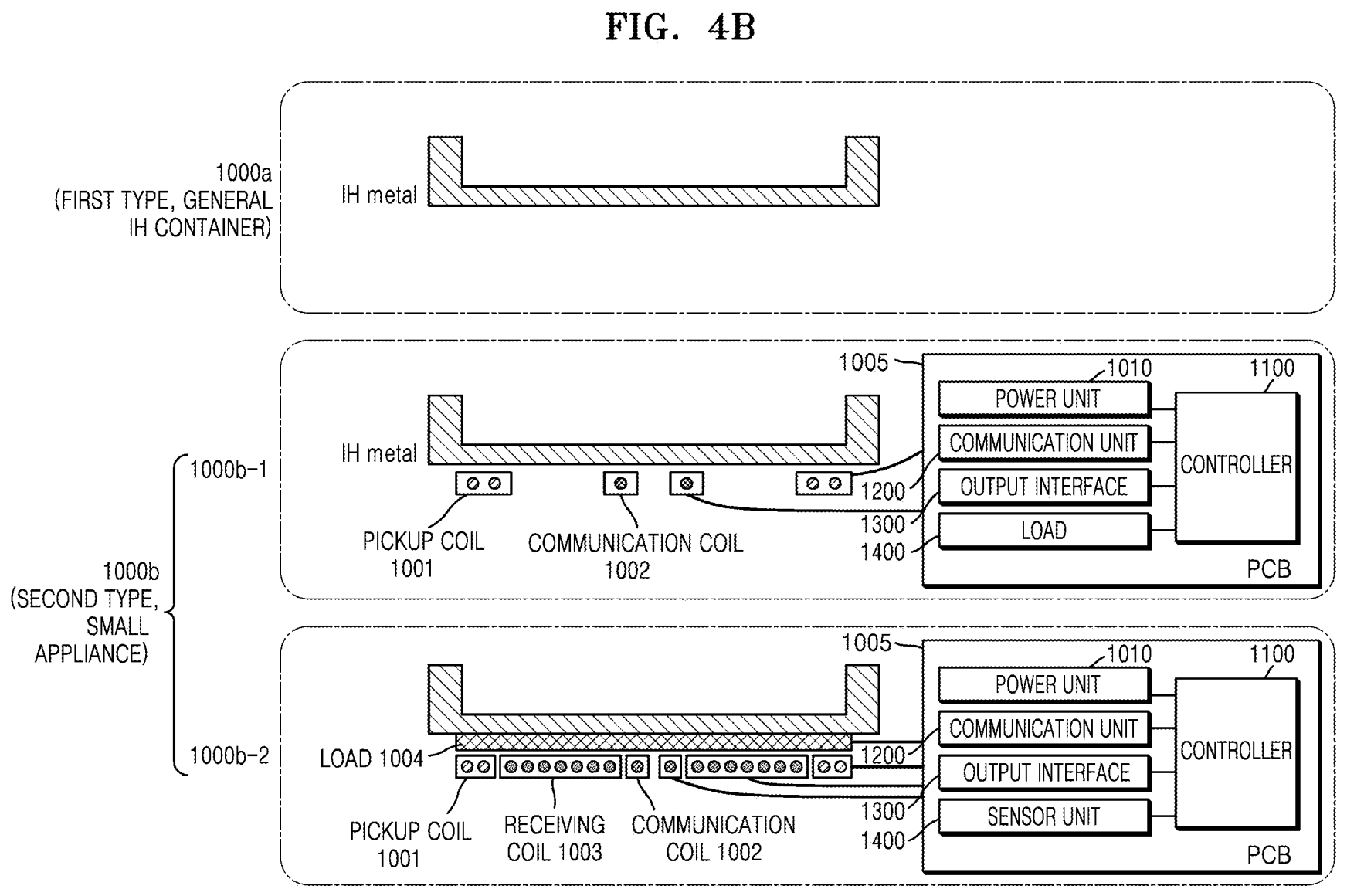

Referring back to FIG. 4B, the second type cooking device 1000b may further include a communication coil 1002. The communication coil 1002 is a coil for performing short-range wireless communication with the station 2000. For example, the communication coil 1002 may be an NFC antenna coil for an NFC communication. Although FIG. 4B shows that the number of turns of the communication coil 1002 is one, the disclosure is not limited thereto. The number of turns of the communication coil 1002 may be plural. For example, the communication coil 1002 may be wound by 5 to 6 turns. An NFC circuit connected to the communication coil 1002 may receive power through the pickup coil 1001.

According to an embodiment of the disclosure, the second type cooking device 1000b may include the second-1 type cooking device 1000b-1 including the IH metal, for example, an iron component, and the second-2 type cooking device 1000b-2 including the receiving coil 1003. For the second-1 type cooking device 1000b-1, like the first type cooking device 1000a that is a general IH container, as an eddy current is generated in the IH metal of the second-1 type cooking device 1000b-1, the contents in the second-1 type cooking device 1000b-1 may be heated. The second-1 type cooking device 1000b-1 may include a smart kettle, a smart pot, and the like, but the disclosure is not limited thereto.

The second-2 type cooking device 1000b-2, compared with the second-1 type cooking device 1000b-1, may further include the receiving coil 1003 and the load 1004. The receiving coil 1003 may be a coil that receives wireless power transmitted from the station 2000 and drives the load 1004. For example, as a magnetic field generated from a current flowing in the transmitting coil of the station 2000 passes through the receiving coil 1003, an induction current flows in the receiving coil 1003 so that energy may be supplied to the load 1004. In the following description, the flowing of the induction current in the receiving coil 1003 by the magnetic field generated in the transmitting coil may be expressed as the receiving coil 1003 receiving wireless power from the transmitting coil. According to an embodiment of the disclosure, the receiving coil 1003 may have a concentric shape or an oval shape, but the disclosure is not limited thereto. According to an embodiment of the disclosure, the receiving coil 1003 may include a plurality of coils. For example, the second-2 type cooking device 1000b-2 may include a receiving coil for a warming heater and a receiving coil for a heating heater. At this time, the receiving coil for a heating heater may drive a heating heater, and the receiving coil for a warming heater may drive a warming heater.

According to an embodiment of the disclosure, in the second-2 type cooking device 1000b-2, the pickup coil 1001, the communication coil 1002, and the receiving coil

1003 may be disposed on the same layer. For example, referring to FIG. 4B, the communication coil 1002 is disposed at the innermost side, the receiving coil 1003 is disposed in the middle, and the pickup coil 1001 may be disposed at the outermost side, but the disclosure is not limited thereto.

Figure 4C:
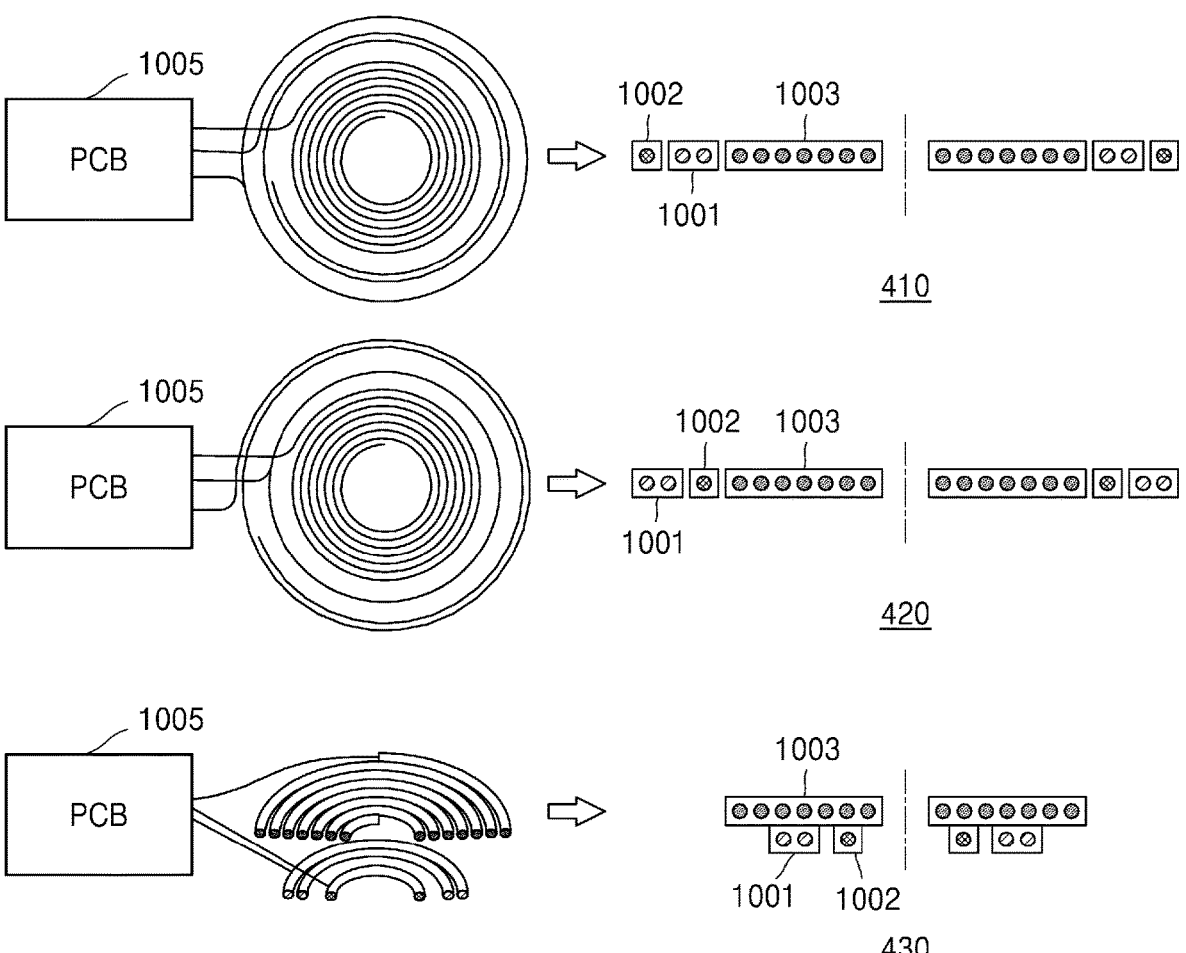

Referring to the first receiving coil arrangement 410 of FIG. 4C, the receiving coil 1003 is disposed at the innermost side, the pickup coil 1001 is disposed in the middle, and the communication coil 1002 may be disposed at the outermost side. Furthermore, referring to the second receiving coil arrangement 420 of FIG. 4C, the receiving coil 1003 is disposed at the innermost side, the communication coil 1002 is disposed in the middle, and the pickup coil 1001 may be disposed at the outermost side. Although not illustrated, according to an embodiment, coils may be disposed in the following order from the innermost side.

1) pickup coil 1001—receiving coil 1003—communication coil 1002.

2) pickup coil 1001—communication coil 1002—receiving coil 1003.

3) communication coil 1002—pickup coil 1001—receiving coil 1003.

According to an embodiment of the disclosure, in the second-2 type cooking device 1000b-2, the pickup coil 1001, the communication coil 1002, and the receiving coil 1003 may be disposed in a stacked structure. For example, referring to the third receiving coil arrangement 430 of FIG. 4C, the pickup coil 1001 and the communication coil 1002, which have relatively not many number of turns, form one layer, and the receiving coil 1003 forms another layer, so that two layers are stacked.

The load 1004 may include a heater, a motor, and the like, but the disclosure is not limited thereto. The heater is to heat the contents in the second-2 type cooking device 1000b-2. The heater may have various shapes, and may include various jacket materials, for example, iron, stainless, copper, aluminum, Incoloy, Inconel, and the like. According to an embodiment of the disclosure, the second-2 type cooking device 1000b-2 may include a plurality of heater. For example, the second-2 type cooking device 1000b-2 may include a warming heater and a heating heater. The warming heater and the heating heater may have heating outputs of different levels. For example, the heating level of a warming heater may be lower than the heating level of a heating heater.

According to an embodiment of the disclosure, the second-2 type cooking device 1000b-2 may further include a resonance capacitor (not shown) between the receiving coil 1003 and the load 1004. At this time, a resonance value may be differently set depending on the amount of power needed by the load 1004. Furthermore, according to an embodiment of the disclosure, the second-2 type cooking device 1000b-2 may further include a switch unit (not shown), for example, a relay switch or a semiconductor switch, to turn on/off the operation of the load 1004.

According to an embodiment of the disclosure, the second-2 type cooking device 1000b-2 may include a heater-applied product, for example, a coffee machine (or a coffee dripper), a toaster, a motor-applied product, for example, a blender, and the like, but the disclosure is not limited thereto.

Moreover, according to an embodiment of the disclosure, as the first type cooking device 1000a includes the IH metal, the first type cooking device 1000a may be detected in an IH container sensing mode of the station 2000, but as the first type cooking device 1000a is not able to communicate with the station 2000, the first type cooking device 1000a may not be detected in a small appliance sensing mode of the station 2000. As the second-1 type cooking device 1000b-1 includes the IH metal, the second-1 type cooking device 1000b-1 may be detected in the IH container sensing mode of the station 2000, and as the second-1 type cooking device 1000b-1 is capable of communicating with the station 2000, the second-1 type cooking device 1000b-1 may be also detected in the small appliance sensing mode of the station 2000. As the second-2 type cooking device 1000b-2 does not include the IH metal, the second-2 type cooking device 1000b-2 may not be detected in the IH container sensing mode of the station 2000, but as the second-2 type cooking device 1000b-2 is capable of communicating with the station 2000, the second-2 type cooking device 1000b-2 may be detected in the small appliance sensing mode of the station 2000.

Figure 4D:
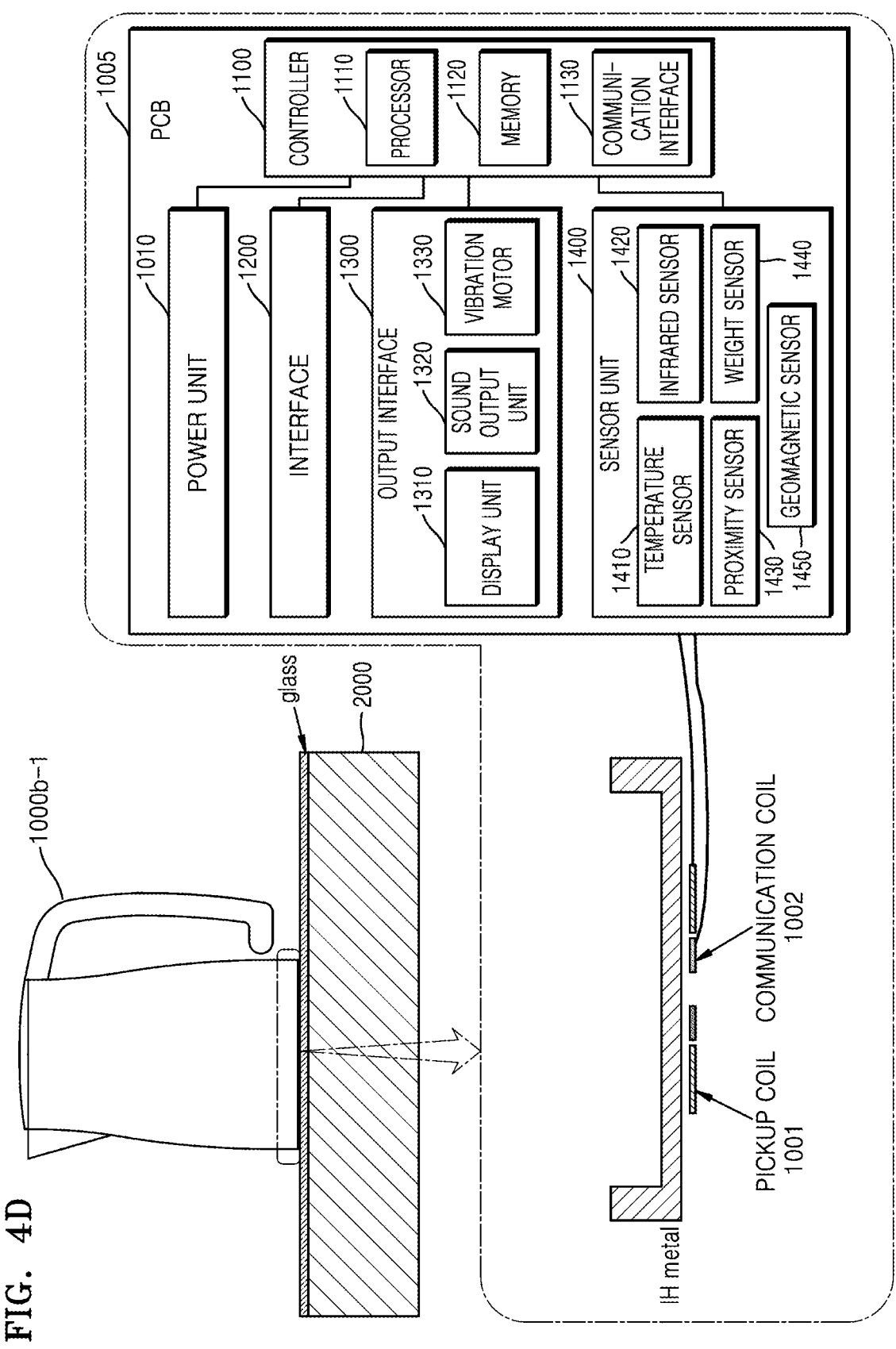

FIG. 4D is a view for describing a cooking device according to an embodiment of the disclosure.

Referring to FIG. 4D, a kettle is illustrated as the second-1 type cooking device 1000b-1 heated through IH. The second-1 type cooking device 1000b-1 may include the pickup coil 1001 and the communication coil 1002. As described above, an eddy current is generated in the second-1 type cooking device 1000b-1 by the power induced from the station 2000, through which the second-1 type cooking device 1000b-1 is heated. Power to drive the PCB 1005 is generated through the pickup coil 1001. The second-1 type cooking device 1000b-1 and the station 2000 may communicated with each other through the communication coil 1002.

Figure 4E:
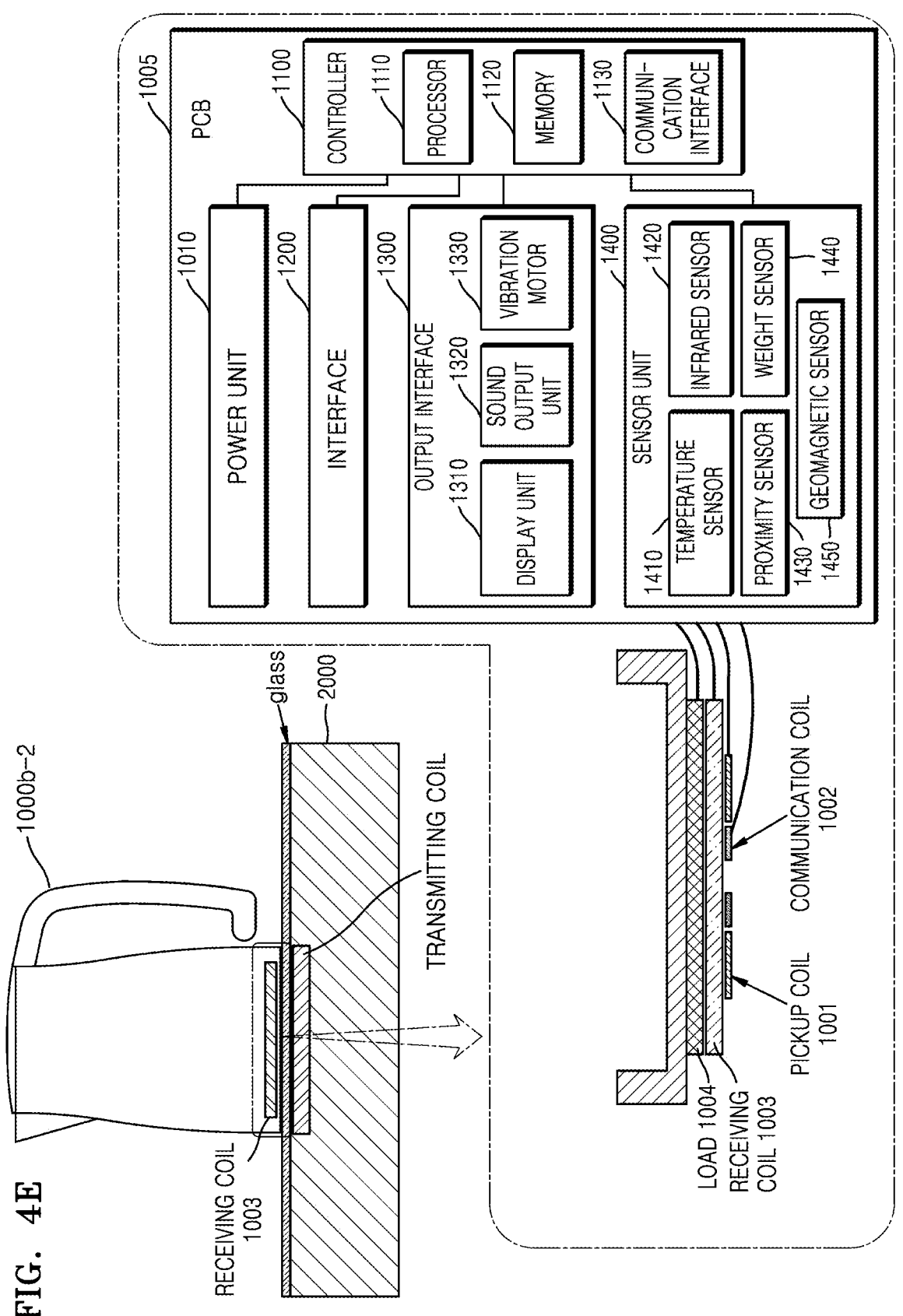

FIG. 4E is a view for describing a cooking device according to an embodiment of the disclosure.

FIG. 4E illustrates a kettle as the (second-2 type) cooking device 1000b-2 heated through the receiving coil 1003.

The (second-2 type) cooking device 1000b-2 illustrated in FIG. 4E may further include the receiving coil 1003 and the load 1004, compared with the first type cooking devices 1000a and 1000b-1 adopting the IH method. The pickup coil 1001 and the communication coil 1002 are described in detail in FIG. 4A. As the controller 1100, the communication unit, or interface, 1200, the output interface 1300, and the sensor unit 1400, which are components that the PCB 1005 includes, are already described in detail with reference to FIG. 5, only the load 1004 and the receiving coil 1003 are described below as heater-type cooking devices.

The receiving coil 1003 may be a coil that receives wireless power transmitted from the station 2000 and drives the load 1004 that is a heater. For example, as a magnetic field generated from a current flowing in the transmitting coil (working coil) of the station 2000 passes through the receiving coil 1003, an induction current flows in the receiving coil 1003 so that energy may be supplied to the (second-2 type) cooking device 1000b-2, in particular the load 1004 that is a heater. According to an embodiment of the disclosure, the receiving coil 1003 may have a concentric shape or an oval shape, but the disclosure is not limited thereto.

The load 1004 is to heat the contents of the (second-2 type) cooking device 1000b-2. The load 1004 operates as a heater, and may have various heater shapes, and may include various jacket materials, for example, iron, stainless, copper, aluminum, Incoloy, Inconel, and the like.

The (second-2 type) cooking device 1000b-2 of a heater type of FIG. 4E is referred to as a power receiving-type cooking device. The power-receiving-type (second-2 type) cooking device 1000b-2 may be a cooking device for heating that drives a heater adjacent to the receiving coil 1003, a cooking device, such as a coffee dripper that drives a heater disposed far, for example, 15 cm, from the receiving coil 1003, or a device, such as a blender that drives a motor through the receiving coil 1003. The power-receiving-type (second-2 type) cooking device 1000b-2 may include a battery, through it is not a cooking device. The battery is charged through the receiving coil 1003 by wirelessly receiving power.

According to an embodiment of the disclosure, the (second-2 type) cooking device 1000b-2 may further include a resonance capacitor between the receiving coil 1003 and the load 1004. At this time, a resonance value may be differently set depending on the amount of power needed by the load 1004. Furthermore, according to an embodiment of the disclosure, the second-2 type cooking device 1000b-2 may further include a switch unit (not shown), for example, a relay switch or a semiconductor switch, to turn on/off the operation of the load 1004.

The receiving coil 1003 and the pickup coil 1001 may wirelessly receive energy from the transmitting coil of the station 2000 through wireless power transmission technology. The wireless power transmission technology is a technology of converting electric energy to the form of an electromagnetic wave and wirelessly transmitting the energy to a load, without a transmission line. According to an embodiment of the disclosure, the wireless power transmission technology may include a magnetic induction method. The magnetic induction method is a technology of supplying energy to a load as most of a magnetic field generated from a current flowing in a primary coil pass through a secondary coil and an induction current flows in the secondary coil. As an example, when the station 2000 continuously or intermittently applies power through the transmitting coil, the pickup coil 1001 may generate power of about 10 W and the receiving coil 1003 may receive power of about 1000 W for driving. The receiving coil 1003 is a relatively "large power coil," and the pickup coil 1001 is a relatively "small power coil."

FIG. 6 is a circuit diagram of a cooking device using multi-power according to an embodiment of the disclosure.

According to an embodiment of the disclosure, household appliances using multi-power may be the cooking device 1000. The cooking device 1000 includes the pickup coil 1001 for wirelessly receiving power from the transmitting coil of the station 2000, a rectification unit 1500 for rectifying an AC of the pickup coil 1001 to a DC, a rectification unit capacitor 1510 for smoothing an output of the rectification unit 1500, a first capacitor 1270 that is a capacitor of a small capacity to quickly stabilize the communication unit, or interface, 1200, and a communication unit power unit 1250 for supplying a reduced voltage from the rectification unit 1500 to the first capacitor 1270. Furthermore, the cooking device 1000 includes a controller power unit 1150 for receiving the output of the rectification unit 1500 and supplying a voltage to a second capacitor 1170 having a large capacity relative to the first capacitor 1270, to stabilize and establish the power of the controller 1100.

The communication unit power unit 1250 and the controller power unit 1150 may each consist of any one of a regulator, an analog relay circuit, or a buck converter that is a down converter. The communication unit power unit 1250 needs to drive the communication unit, or interface, 1200 only, so it is sufficient to have a supply capacity enough to supply low power of several tens of milliwatts (mW). According to an embodiment, the controller 1100 may need power of 0.5 W to 200 W depending on the design specification when driving the processor 1110 of the controller 1100. When driving the controller 1100 and the output interface 1300 together, the cooking device 1000 may need power of several hundreds of watts (W).

When the pickup coil 1001 wirelessly receives power, the received power is rectified through the rectification unit 1500, and the charge of the first capacitor 1270 that is a relatively low-capacity capacitor is quickly completed, compared with the second capacitor 1170, and thus, the communication unit, or interface, 1200 has power stabilization within a short time of about 100 ms, compared with the controller 1100. When the power stabilization is carried out, the communication unit, or interface, 1200 may transmit, to the station 2000, data of at least one of the identification information of the cooking device 1000 that is household appliances, the welcome message when the cooking device 1000 is turned on, or the status information of the cooking device 1000.

The power of the controller 1100 is stabilized as the charge of the second capacitor 1170 having a large capacity relative to the first capacitor 1270 is completed, and thus, the controller 1100 is activated later than the communication unit, or interface, 1200. When the power of the controller 1100 is activated, the controller 1100 performs the overall control of the cooking device 1000 through the processor 1110.

Figure 7:
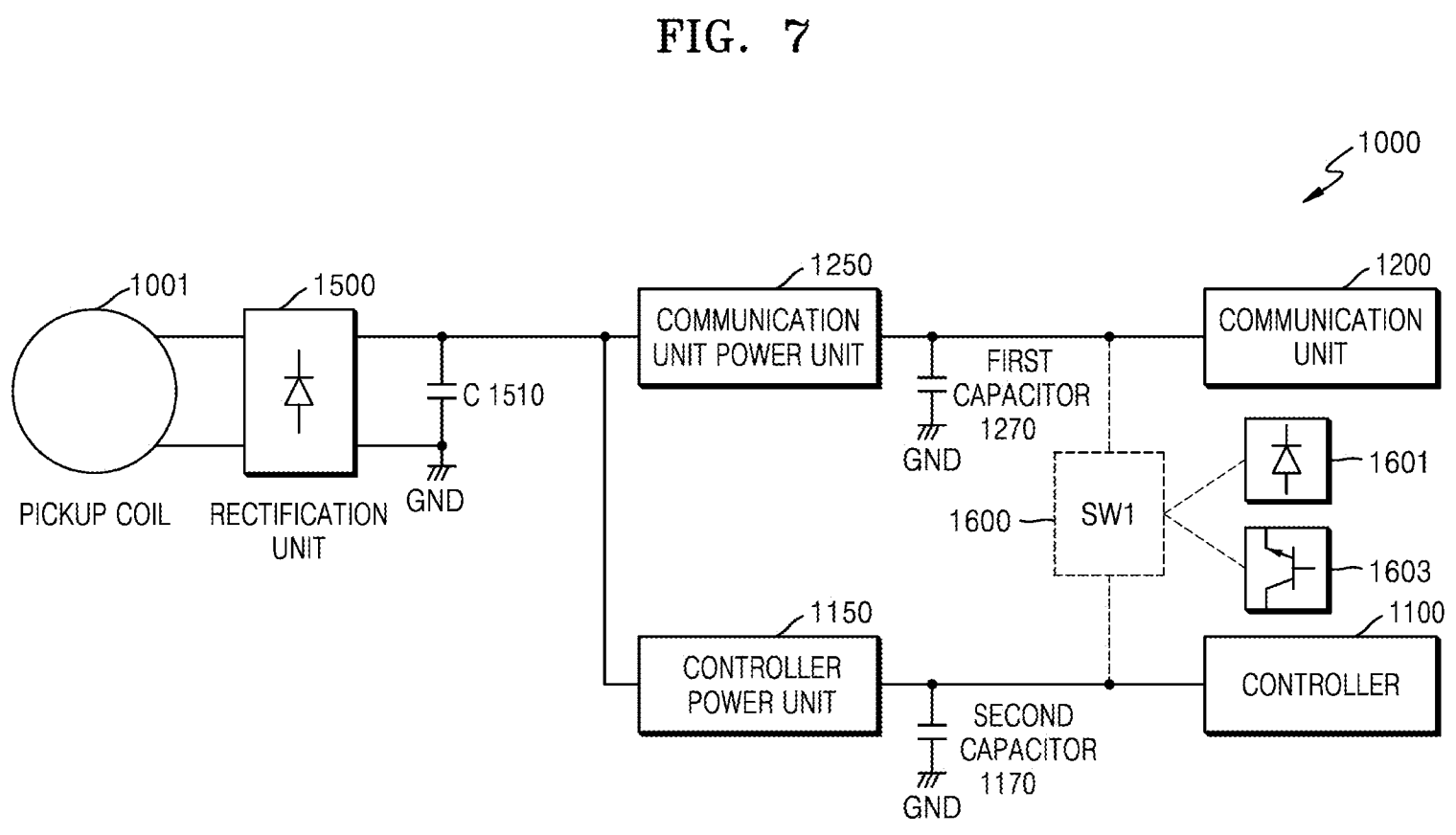

FIG. 7 is a circuit diagram of a cooking device 1000 using multi-power according to an embodiment of the disclosure.

According to an embodiment of the disclosure, the cooking device 1000 using multi-power of FIG. 7 may further include a first switch SW1 1600 for connecting the first capacitor 1270 to the second capacitor 1170. The cooking device 1000 using multi-power according to FIG. 7 operates as shown above in FIG. 6. However, when the power of the controller 1100 of the cooking device 1000 is stabilized, the power established by the second capacitor 1170 may be shared by the communication unit, or interface, 1200 and the controller 1100 through the first switch SW1 1600 and used together.

According to an embodiment of the disclosure, the first switch SW1 1600 may be a diode D1 1601 or a transistor 1603, but the disclosure is not limited thereto, and any electronic device to be used as a switch, for example, a field effect transistor (FET), an insulated gate bipolar transistor (IGBT), and the like, may be used as the first switch SW1 1600.

When the first switch SW1 1600 is the diode D1 1601, the positive (+) pole of the second capacitor 1170 is connected to the anode of the diode D1 1601, and the positive (+) pole of the first capacitor 1270 is connected to the cathode of the diode D1 1601. When the power of the controller 1100 is stabilized, the communication unit, or interface, 1200 and the controller 1100 may share the power of the second capacitor 1170 through the first switch SW1 1600.

When the first switch SW1 1600 is the transistor 1603, the positive (+) pole of the second capacitor 1170 is connected to the collector of the transistor 1603, and the positive (+) pole of the first capacitor 1270 is connected to the emitter of the transistor 1603. When the power of the controller 1100 is stabilized, the communication unit, or interface, 1200 and the controller 1100 may share the power of the second capacitor 1170 through the transistor 1603 that is the first switch SW1 1600.

According to an embodiment of the disclosure, after the cooking device 1000 wirelessly receives power through the pickup coil 1001 and a time passes including a stabilization time of the power of the controller 1100 through the second capacitor 1170, the controller 1100 turns the transistor 1603 on so that the controller 1100 may share power with the communication unit, or interface, 1200. According to an embodiment, the time may be a time when the charge of the second capacitor 1170 is completed or a time during which a particular amount of electricity is charged in the second capacitor 1170.

Figure 8A:
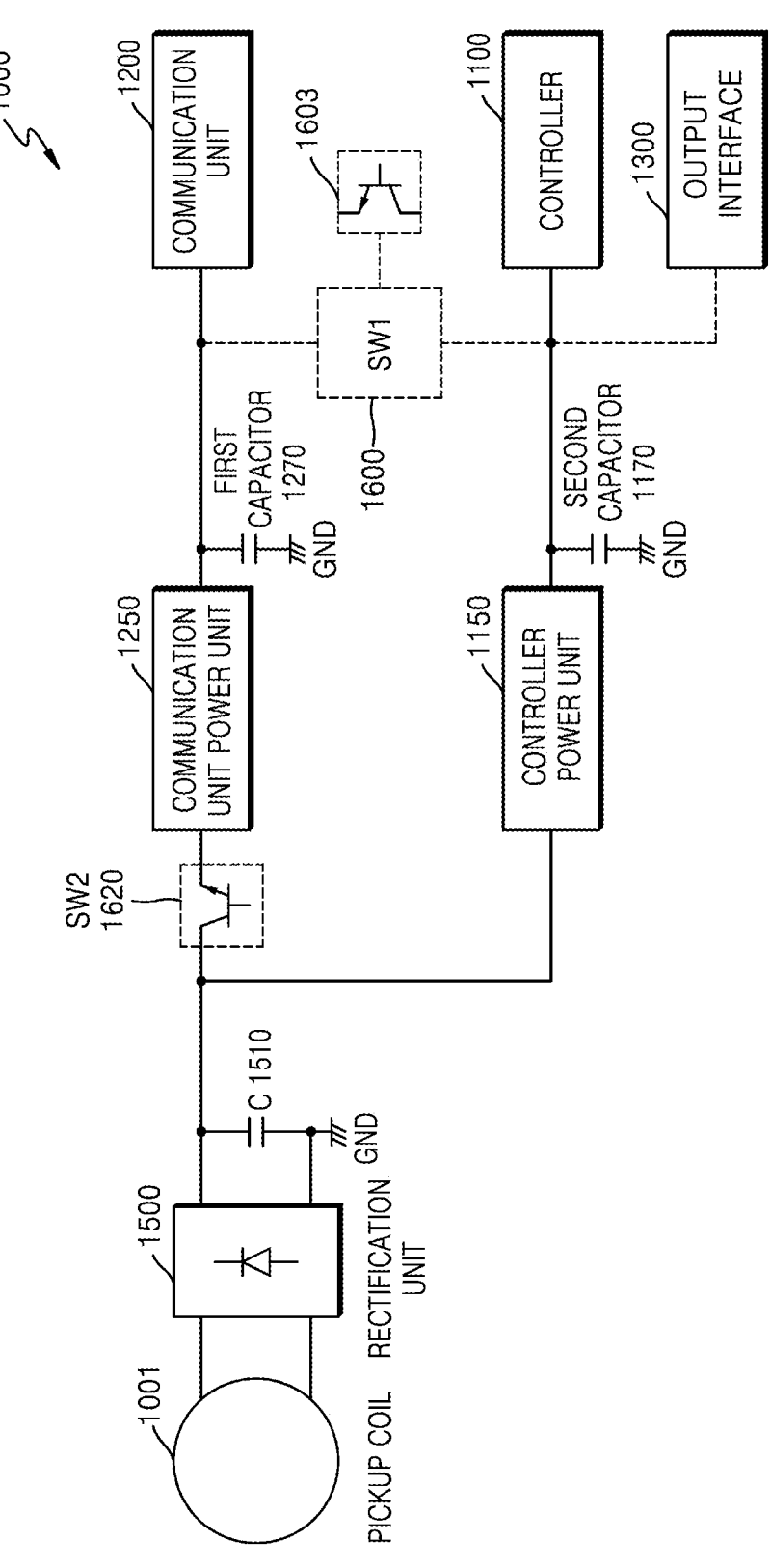
FIG. 8A is a circuit diagram of a cooking device using multi-power according to an embodiment of the disclosure.

FIG. 8A is a circuit diagram of the cooking device 1000 using multi-power according to an embodiment of the disclosure.

According to an embodiment of the disclosure, the cooking device 1000 using multi-power according to FIG. 8A may optionally include a communication unit switch SW2 1620 between the rectification unit 1500 (or the rectification unit capacitor 1510) and the communication unit power unit 1250.

When the controller 1100 turns the transistor 1603 on after a time passes, and the controller 1100 shares power with the communication unit, or interface, 1200, the communication unit switch SW2 1620 connected between the rectification unit 1500 and the first capacitor 1270 is turned off so that the communication unit, or interface, 1200 no longer receives power from the rectification unit 1500 to receive power through the second capacitor 1170. In this case, as the communication unit power unit 1250 does not need to operate any longer, the power consumed in the communication unit power unit 1250 may be saved.

According to an embodiment of the disclosure, the controller 1100 may control the opening/closing (on/off) of the communication unit switch SW2 1620 that connects the rectification unit 1500 or the rectification unit capacitor 1510 to the communication unit power unit 1250, ultimately the first capacitor 1270, depending on the charge amount of the second capacitor 1170. In other words, when the controller 1100 determines that the charge amount of the second capacitor 1170 decreases below a threshold value that is considered to be inappropriate to supply power to both of the communication unit, or interface, 1200 and the controller 1100, the controller 1100 turns the communication unit switch SW2 1620 on so that the communication unit power unit 1250 may receive power directly from the rectification unit 1500. According to an embodiment, the controller 1100 may simultaneously turn off the transistor 1603.

According to an embodiment, when the cooking device 1000 includes a battery (not shown), and the controller 1100 determines that the charge amount of the second capacitor 1170 decreases below a threshold value that is considered to be inappropriate to supply power to both of the communication unit, or interface, 1200 and the controller 1100, the controller 1100 may be connected to the battery.

According to an embodiment, although the communication unit switch SW2 1620 may include a transistor, the disclosure is not limited thereto, and any electronic device to be used as a switch, for example, an FET, an IGBT, and the like, may be used as the communication unit switch SW2 1620.

According to an embodiment, in the cooking device 1000 of FIG. 8A, the output interface 1300, with the controller 1100, may also receive power through the second capacitor 1170. In this case, the capacitance of the second capacitor 1170 may be more generous, or discharge more power, than when supplying power only to the controller 1100.

Figure 8B:
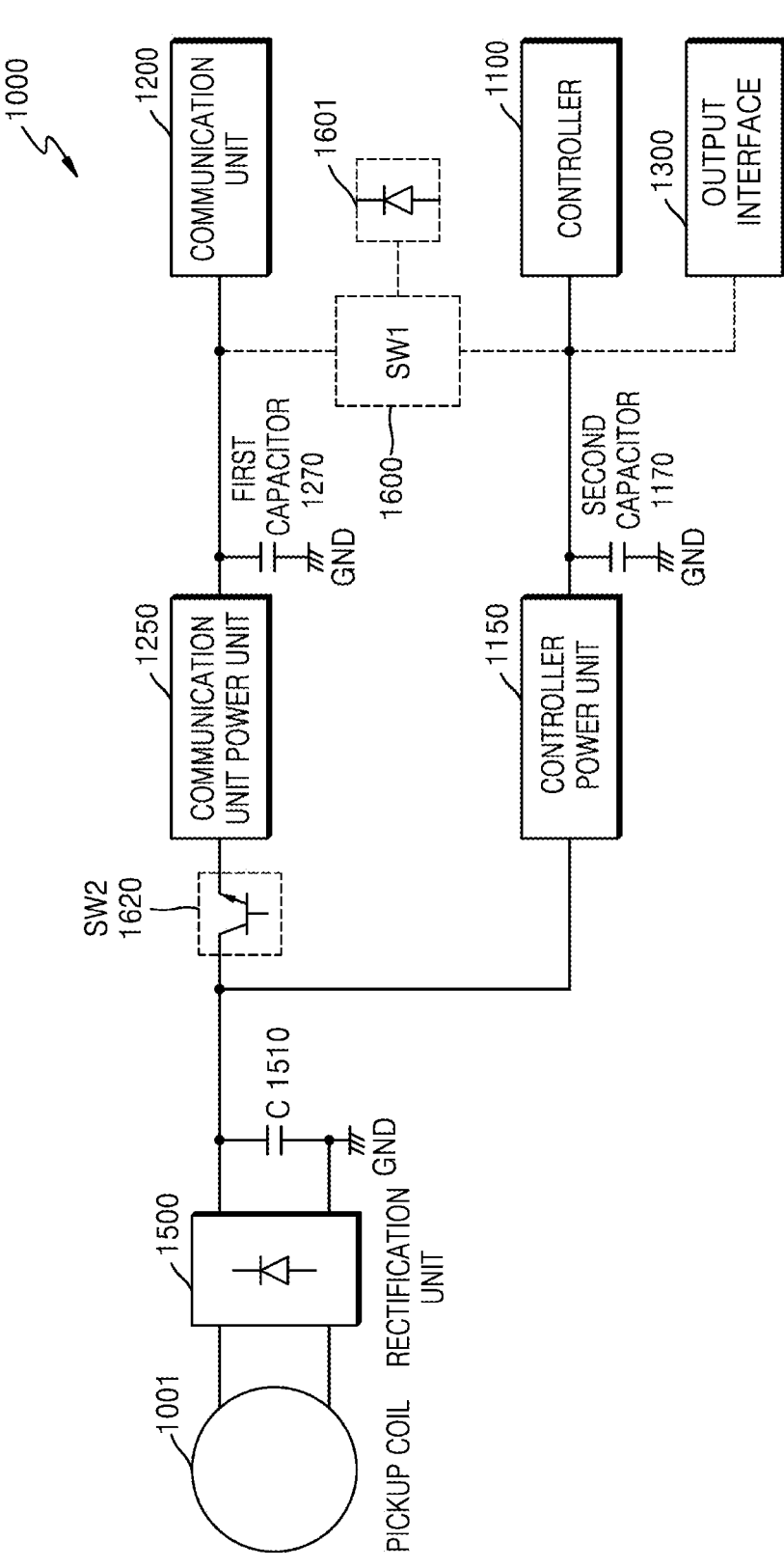
FIG. 8B is another circuit diagram of a cooking device using multi-power according to an embodiment of the disclosure.

FIG. 8B is another circuit diagram of a cooking device using multi-power according to an embodiment of the disclosure.

According to an embodiment of the disclosure, in the cooking device 1000 using multi-power of FIG. 8B, the first diode D1 1601 is connected between the second capacitor 1170 and the first capacitor 1270, and the communication unit switch SW2 1620 is connected between the rectification unit 1500 (or the rectification unit capacitor 1510) and the communication unit power unit 1250.

When the power of the controller 1100 is stabilized, the communication unit, or interface, 1200 may share and use the stabilized power of the controller 1100 as the power of the communication unit, or interface, 1200. In an embodiment, the controller 1100 may turn off the communication unit switch SW2 1620 connected between the rectification unit 1500 and the first capacitor 1270 based on the power establishment of the controller 1100 so that the communication unit, or interface, 1200 may no longer receive power from the rectification unit 1500, but may receive power through the second capacitor 1170. In this case, as the communication unit power unit 1250 no longer needs to operate, the power consumed in the communication unit power unit 1250 may be saved.

According to an embodiment of the disclosure, the controller 1100 may control the opening/closing (on/off) of the communication unit switch SW2 1620 that connects the rectification unit 1500 or the rectification unit capacitor 1510 to the communication unit power unit 1250, ultimately the first capacitor 1270, depending on the charge amount of the second capacitor 1170. In an embodiment, when the charge amount of the second capacitor 1170 decreases below a threshold value that is considered to be inappropriate to supply power to both of the communication unit, or interface, 1200 and the controller 1100, the controller 1100 turns the communication unit switch SW2 1620 on so that the communication unit power unit 1250 may receive power directly from the rectification unit 1500.

According to an embodiment, in the cooking device 1000 of FIG. 8B, the output interface 1300, with the controller 1100, may also receive power through the second capacitor 1170. In this case, the capacitance of the second capacitor 1170 may be more generous, or supply more power, than when supplying power only to the controller 1100.

Figure 9:
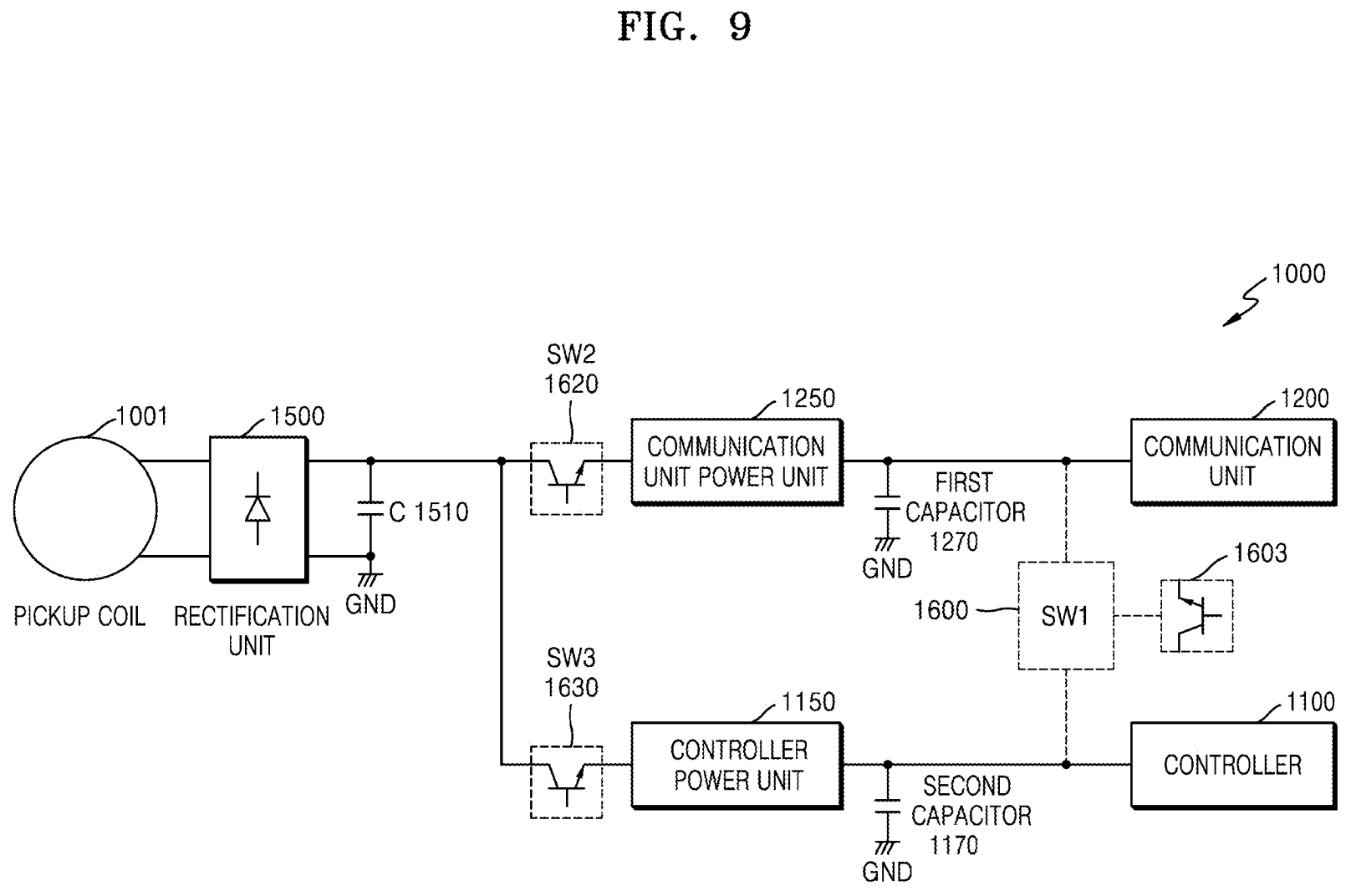

FIG. 9 is another circuit diagram of a cooking device using multi-power according to an embodiment of the disclosure.

According to an embodiment of the disclosure, the cooking device 1000 may include a controller switch SW3 1630 between the rectification unit 1500 (or the rectification unit capacitor 1510) and the controller power unit 1150.

According to an embodiment, as a controller switch SW3 1630 is maintained in an off state until the power of the communication unit, or interface, 1200 is stabilized, the power generated from the pickup coil 1001 may be solely used for the stabilization of the power of the communication unit, or interface, 1200.

When the power of the communication unit, or interface, 1200 is quickly stabilized, the controller switch SW3 1630 is turned on to activate the controller 1100, based on the activation (power stabilization) of the communication unit, or interface, 1200. According to an embodiment, before the controller 1100 is activated, the opening/closing of the controller switch SW3 1630 may be controlled by the processor 1210 of the communication unit, or interface, 1200.

According to an embodiment of the disclosure, although the controller switch SW3 1630 may include a transistor, the disclosure is not limited thereto, and any electronic device to be used as a switch, for example, an FET, an IGBT, and the like, may be used as the controller switch SW3 1630.

Figure 10:
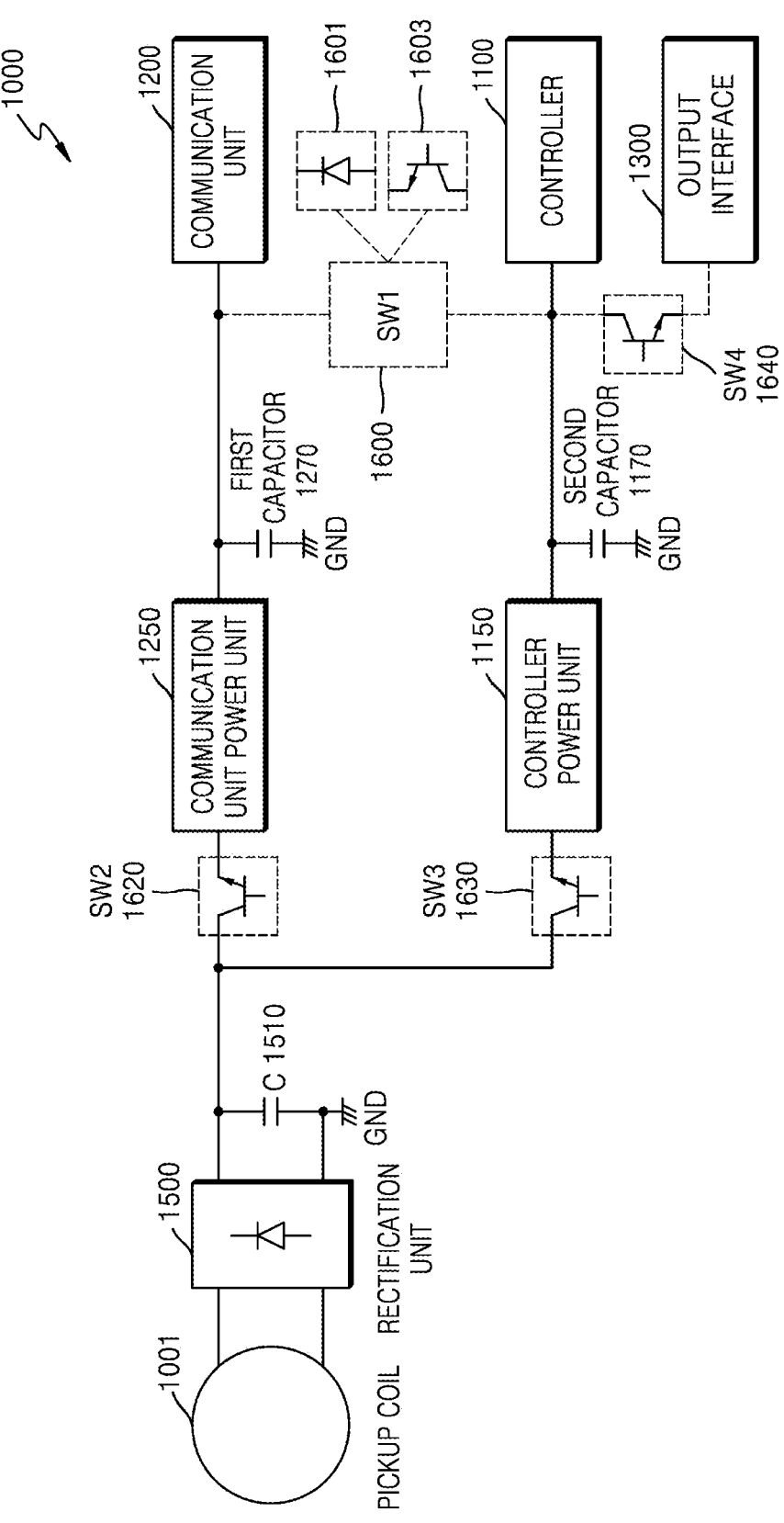
FIG. 10 is another circuit diagram of a cooking device using multi-power according to an embodiment of the disclosure.

FIG. 10 is another circuit diagram of the cooking device 1000 using multi-power according to an embodiment of the disclosure.

According to an embodiment of the disclosure, as not only the controller 1100 but also the output interface 1300 are connected to an output end of the second capacitor 1170, the output interface 1300 may use the power supplied to the controller 1100 with the controller 1100. The output interface 1300 may drive the display unit 1310, a sound output unit 1320, and/or a vibration motor 1330 through the power supplied from the second capacitor 1170 and shared by the controller 1100. According to an embodiment, after the power stabilization of the controller 1100, in order to sequentially stabilize the output interface 1300, an output interface switch SW4 1640 may be provided between the second capacitor 1170 and the output interface 1300. When the power stabilization of the controller 1100 is accomplished, the processor 1110 of the controller 1100 may turn the output interface switch SW4 1640 on with the power stabilization of the controller 1100 as a switch control event. When the output interface switch SW4 1640 is turned on, the power through the second capacitor 1170 may be supplied to the output interface 1300.

In another embodiment, the cooking device 1000 may simultaneously perform the power stabilization of the controller 1100 and the output interface 1300 without the output interface switch SW4 1640 through the second capacitor 1170.

Figure 11:
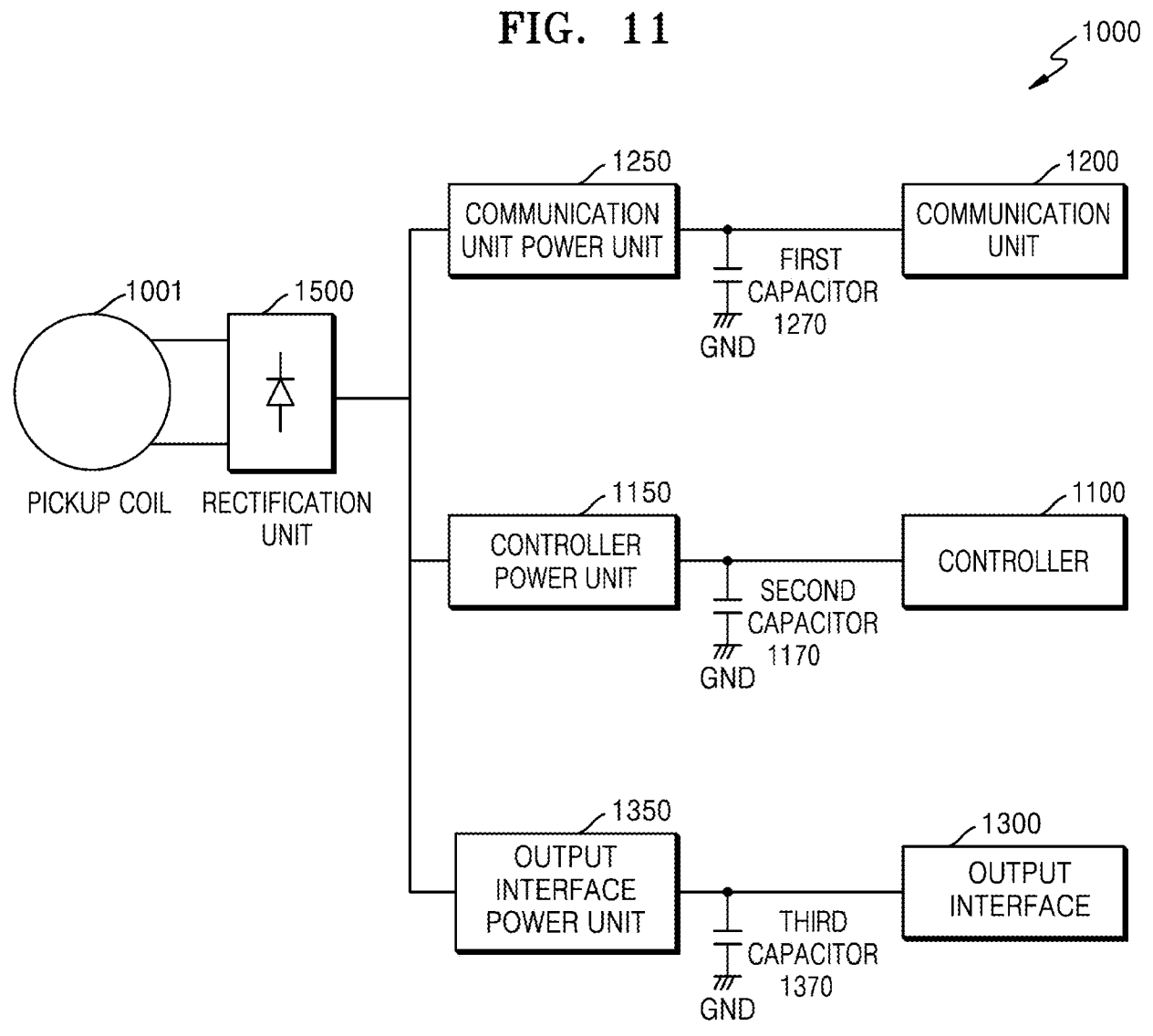

FIG. 11 is a circuit diagram of a cooking device using triple-power according to an embodiment of the disclosure.

According to an embodiment of the disclosure, the cooking device 1000 includes the pickup coil 1001 for wirelessly receiving power from the transmitting coil of the station 2000, the rectification unit 1500 for rectifying an AC of the pickup coil 1001 to a DC, a rectification unit capacitor (not shown) for stabilizing an output of the rectification unit 1500, the first capacitor 1270 that is a capacitor of a small capacity to quickly stabilize the communication unit, or interface, 1200, and the communication unit power unit 1250 for supplying a reduced voltage from the rectification unit 1500 to the first capacitor 1270. Furthermore, the cooking device 1000 may include the controller power unit 1150 for receiving the output of the rectification unit 1500 and supplying a voltage to the second capacitor 1170 that is a large capacity relative to the first capacitor 1270, to stabilize the power of the controller 1100. The cooking device 1000 may include an output interface power unit 1350 for receiving the output of the rectification unit 1500 and supplying a voltage to a third capacitor 1370, to stabilize the power supplied to the output interface 1300. The third capacitor 1370 may have a large capacity relative to the second capacitor 1170.

The communication unit power unit 1250, the controller power unit 1150, and the output interface power unit 1350 may consist on any one of a regulator, an analog relay circuit, or a buck converter that is a down converter, to supply the output of the rectification unit 1500 to each of the first capacitor 1270, the second capacitor 1170, and the third capacitor 1370. As the communication unit power unit 1250 needs to drive the communication unit, or interface, 1200 only, it is sufficient for the communication unit power unit 1250 to have a supply capability of supplying low power of about several tens of milliwatts. According to an embodiment, the controller 1100 may need power of about 0.5 W to 200 W, which varies depending on design specifications. According to an embodiment, the output interface 1300 may consume several hundreds of watts and may need more power than the controller 1100.

When the pickup coil 1001 of the cooking device 1000 wirelessly receives power, the received power is rectified through the rectification unit 1500, and the charge of the first capacitor 1270 of a low capacity is quickly completed compared with the second capacitor 1170 and the third capacitor 1370. Accordingly, the power stabilization of the communication unit, or interface, 1200 is accomplished within a quick time of about 100 ms, compared with the controller 1100 and the output interface 1300. The communication unit, or interface, 1200, with the completion of power stabilization, may transmit to the station 2000 data of at least one of the identification information of the cooking device 1000, the welcome message when the cooking device 1000 is turned on, or the status information of the cooking device 1000.

According to an embodiment, as the charge of the second capacitor 1170 of a larger capacity than the first capacitor 1270 is completed, the power of the controller 1100 is stabilized. Accordingly, the power of the controller 1100 is stabilized later than the communication unit, or interface, 1200, but slightly earlier that the output interface 1300. When the power of the controller 1100 is stabilized, the controller 1100 may perform the overall control of the cooking device 1000 through the processor 1110.

According to an embodiment, as the charge of the third capacitor 1370 having a larger capacity than the second capacitor 1170 is completed, the power for the output interface 1300 is stabilized so that the power of the output interface 1300 is stabilized later than the controller 1100. When the power of the output interface 1300 is stabilized, the cooking device 1000 may perform a visual output, an auditory output, and/or a tactile output through the display unit 1310 of the output interface 1300, the sound output unit 1320, and/or the vibration motor 1330.

In the circuit diagram of FIG. 11, when the capacitance of the first capacitor 1270 is $C_1$, the capacitance of the second capacitor 1170 is $C_2$, and the capacitance of the third capacitor 1370 is $C_3$, an inequality that $C_3 \geq C_2 \geq C_1$ may be established. Accordingly, the capacitance size of each capacitor may be related to a power stabilization time.

Figure 12:
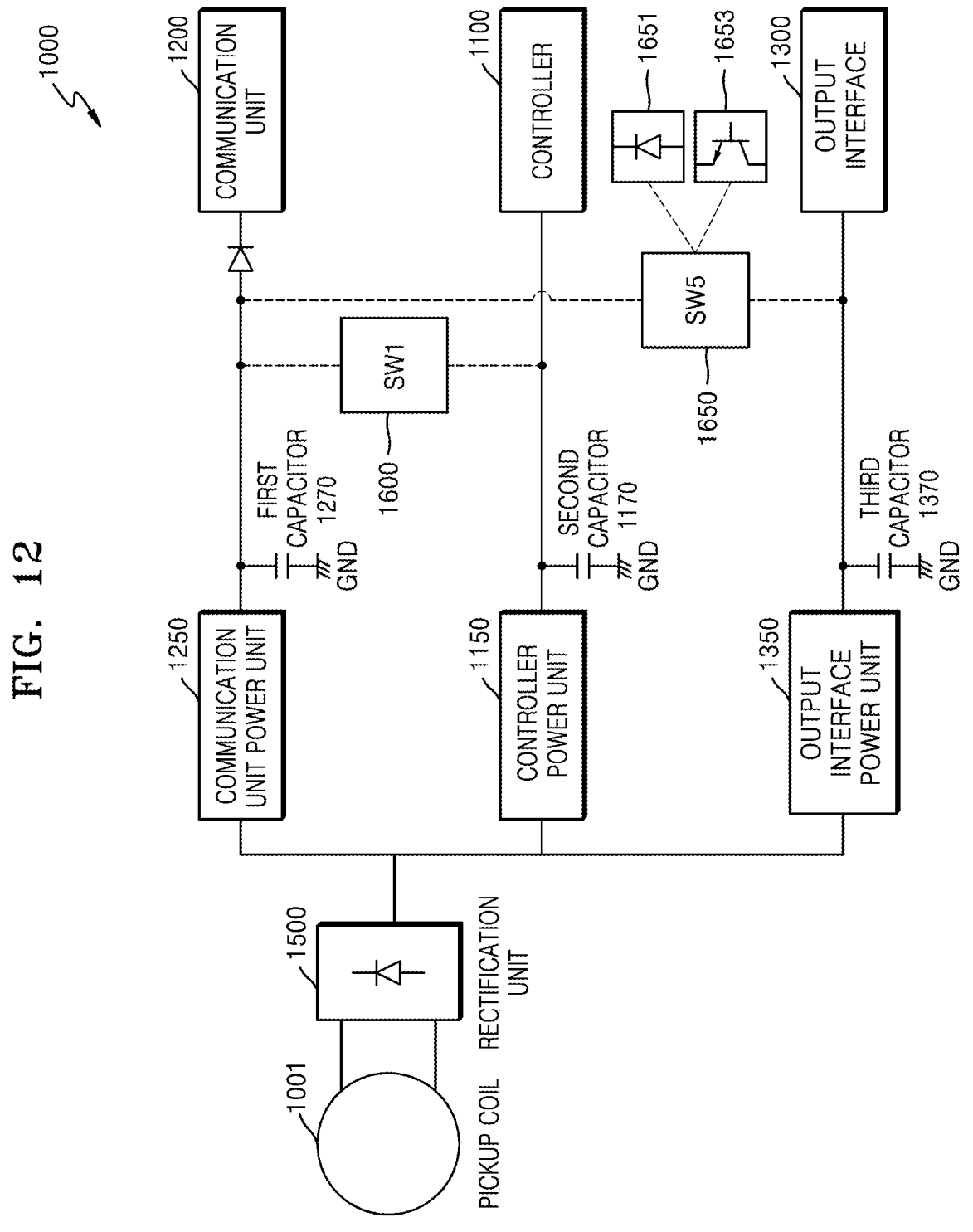
FIG. 12 is another circuit diagram of a cooking device using triple-power according to an embodiment of the disclosure.

FIG. 12 is another circuit diagram of the cooking device 1000 using triple-power according to an embodiment of the disclosure.

Referring to FIG. 12, when the power stabilization of the output interface 1300 is accomplished by the third capacitor 1370 having the largest capacitance among three capacitors, power may be supplied from the third capacitor 1370 to the communication unit, or interface, 1200 through a fifth switch SW5 1650. According to an embodiment of the disclosure, the fifth switch SW5 1650 may be a diode 1651 or a transistor 1653, but the disclosure is not limited thereto, and any electronic device to be used as a switch, for example, an FET, an IGBT, and the like, may be used as the fifth switch SW5 1650.

Furthermore, according to an embodiment of the disclosure, when the power of the controller 1100 is established through the first switch SW1 1600 that connects the second capacitor 1170 to the first capacitor 1270, the communication unit, or interface, 1200 may share and use the power established in the second capacitor 1170. According to an embodiment, when the power stabilization of the output interface 1300 is accomplished by the third capacitor 1370, the controller 1100 may turn on anyone of the fifth switch SW5 1650 and the first switch SW1 1600.

Figure 13:
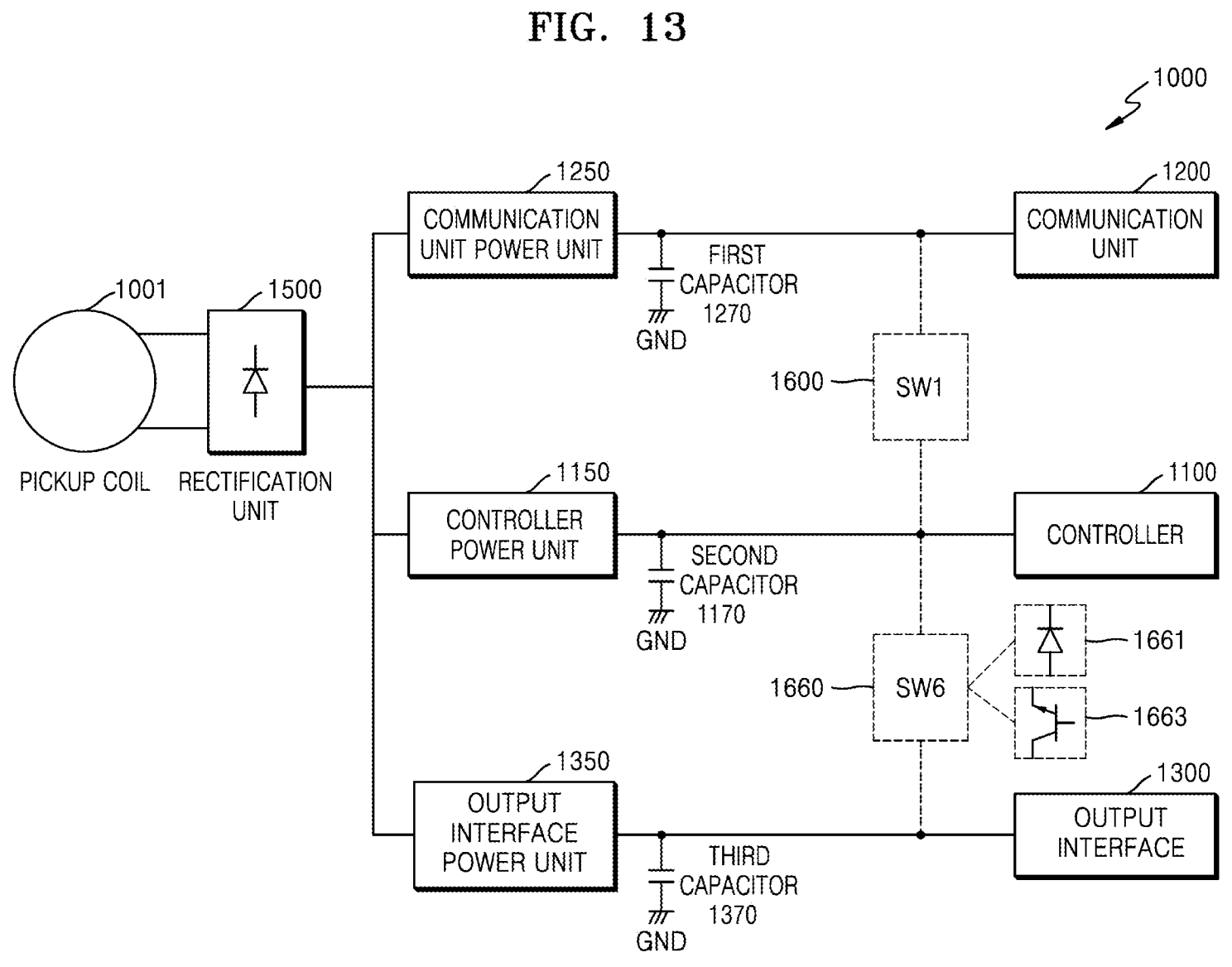

FIG. 13 is another circuit diagram of the cooking device 1000 using triple-power according to an embodiment of the disclosure.

Referring to FIG. 13, when the power stabilization of the output interface 1300 is accomplished by the third capacitor

1370 having the largest capacitance among three capacitors, sixth switches SW6 1660 are turned on by the third capacitor 1370 so that power may be supplied to the controller 1100. According to an embodiment of the disclosure, the sixth switch SW6 1660 may be a diode 1661 or a transistor 1663, but the disclosure is not limited thereto, and any electronic device to be used as a switch, for example, an FET, an IGBT, and the like, may be used as the sixth switch SW6 1660.

Furthermore, according to an embodiment of the disclosure, when the power of the output interface 1300 is established through the first switch SW1 1600 that connects the second capacitor 1170 to the first capacitor 1270, the power established in the third capacitor 1370 may be shared and used not only by the controller 1100, but also by the communication unit, or interface, 1200. According to an embodiment, the controller 1100 may control such that, after the power stabilization of the output interface 1300, the sixth switch SW6 1660 is turned on, and then the first switch SW1 1600 is turned. Alternatively, the controller 1100 may control such as, after the power stabilization of the output interface 1300, the sixth switch SW6 1660 and the first switch SW1 1600 are simultaneously turned on. At this time, a switch control may be performed by the processor 1110 of the controller 1100.

According to an embodiment, as the power is stabilized in an order of the communication unit, or interface, 1200, the controller 1100, the output interface 1300, when the power of the controller 1100 is stabilized, the controller 1100 may control the first switch SW1 1600 to be turned on, and then, when the power of the output interface 1300 is stabilized, control the sixth switch SW6 1660 to be turned on. When the power supply to the communication unit, or interface, 1200, the controller 1100, and the output interface 1300 of FIG. 13 is accomplished with only the third capacitor 1370 having the largest capacitance, by turning on the first switch SW1 1600 and the sixth switch SW6 1660, power consumed by the communication unit power unit 1250 and the controller power unit 1150 may be saved.

Figure 14:
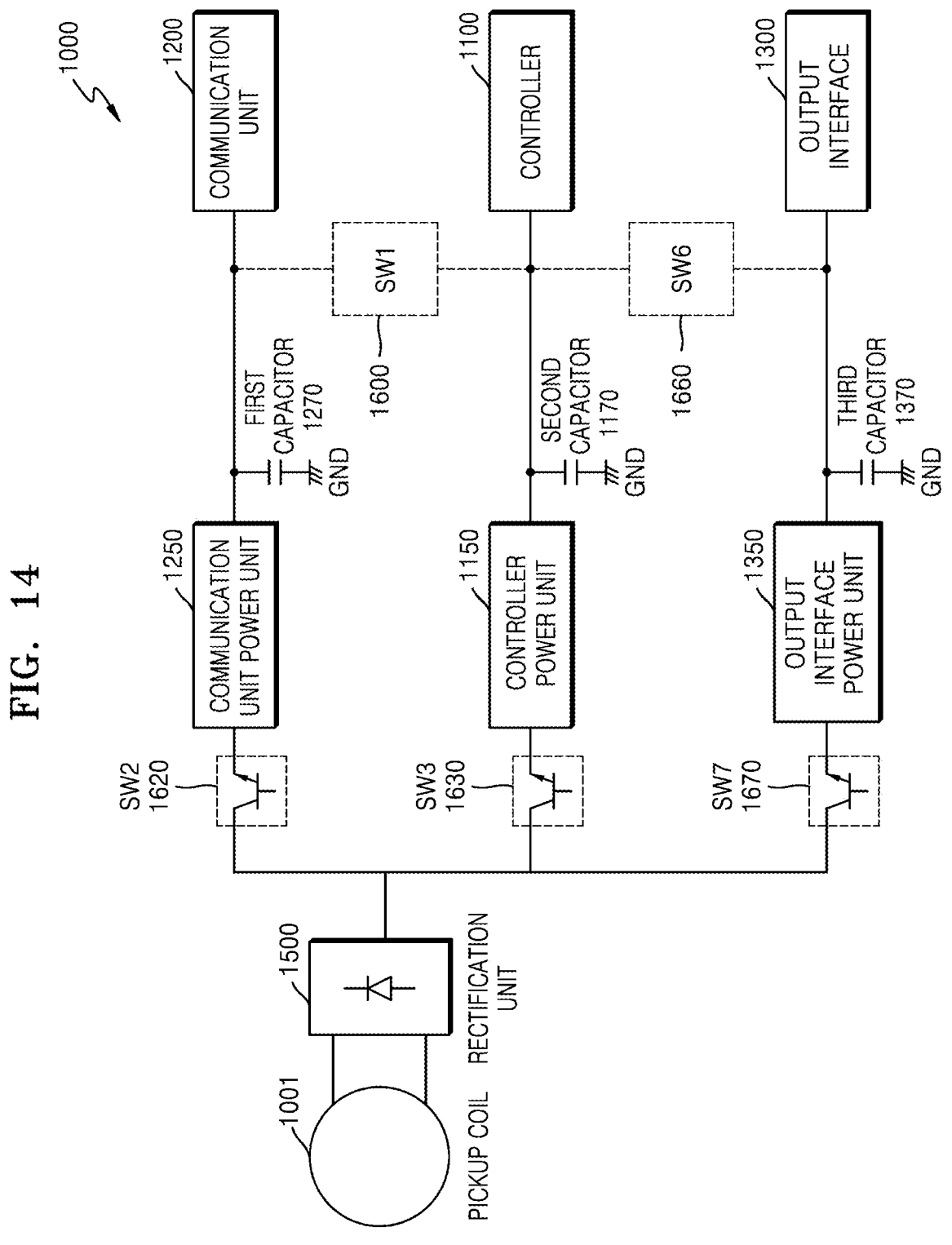
FIG. 14 is another circuit diagram of a cooking device using triple-power according to an embodiment of the disclosure.

FIG. 14 is another circuit diagram of a cooking device using triple-power according to an embodiment of the disclosure.

According to an embodiment of the disclosure, the cooking device 1000 using multi-power of FIG. 14 may be optionally provided with the communication unit switch SW2 1620 at the front end of the communication unit power unit 1250, the controller switch SW3 1630 at the front end of the controller power unit 1150, and/or a seventh switch SW7 1670 at the front end of the output interface power unit 1350.

In an embodiment of the disclosure, in order to quickly stabilize the power of the communication unit, or interface, 1200, the cooking device 1000 turns off the controller switch SW3 1630 and the seventh switch SW7 1670 and turns on the communication unit switch SW2 1620 only, thereby stabilizing the power of the communication unit, or interface, 1200 only. Next, the cooking device 1000 turns the controller switch SW3 1630 on to stabilize the power of the controller 1100, based on the stabilization of the power of the communication unit, or interface, 1200. Next, the cooking device 1000 may stabilize the power of the output interface 1300 by turning the seventh switch SW7 1670 on, based on the stabilization of the power of the controller 1100.

According to an embodiment of the disclosure, as described above in FIG. 13, when the power of the output interface 1300 is established (power stabilized) through the first switch SW1 1600 that connects the second capacitor

1170 to the first capacitor 1270 and the sixth switch SW6 1660 that connects the third capacitor 1370 to the second capacitor 1170, the power established in the third capacitor 1370 may be shared and used not only by the controller 1100, but also by the communication unit, or interface, 1200. According to an embodiment, after the power stabilization of the output interface 1300, the controller 1100 may control the switches by turning on the sixth switch SW6 1660 and the first switch SW1 1600 in sequence. Alternatively, after the power stabilization of the output interface 1300, the controller 1100 may control the switches to simultaneously turn on the sixth switch SW6 1660 and the first switch SW1 1600. According to an embodiment, when the first switch SW1 1600 is turned on, the communication unit switch SW2 1620 is turned off, so that the connection between the communication unit power unit 1250 and the rectification unit 1500 may be broken. Furthermore, when the sixth switch SW6 1660 is turned on, the controller 1100 turns off the controller switch SW3 1630 so that the connection between the controller power unit 1150 and the rectification unit 1500 may be broken. By turning off the communication unit switch SW2 1620 and the controller switch SW3 1630, the controller 1100 may enable total power supply to the communication unit, or interface, 1200, the controller 1100, and the output interface 1300, which are major components of the cooking device 1000, through the connection of the third capacitor 1370, the sixth switch SW6 1660, and the first switch SW1 1600, without power consumption in the communication unit power unit 1250 and the controller power unit 1150.

Figure 15:
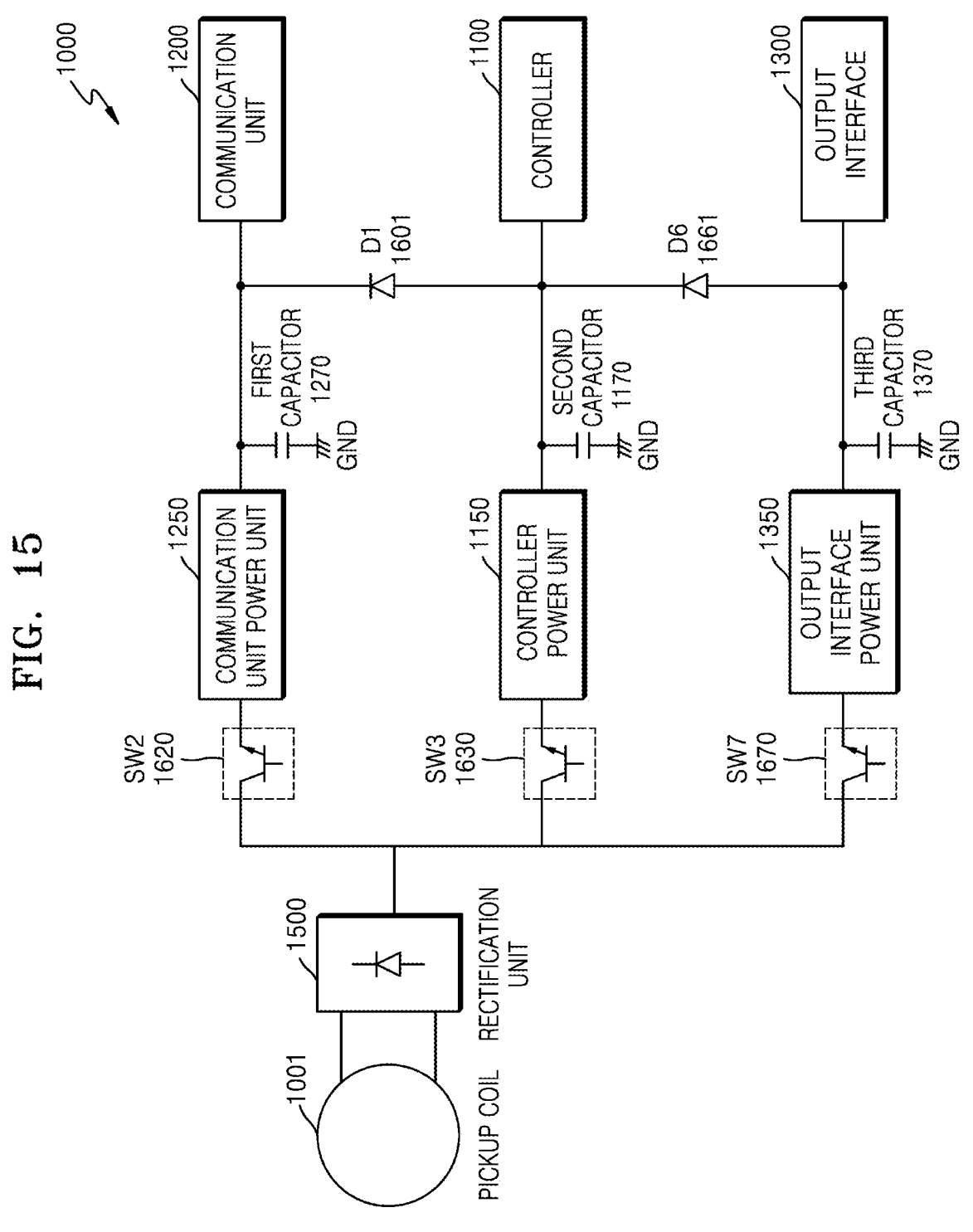
FIG. 15 is a circuit diagram of a cooking device using triple-power according to an embodiment of the disclosure.

FIG. 15 is a circuit diagram of the cooking device 1000 using multi-power according to an embodiment of the disclosure.

According to an embodiment of the disclosure, the cooking device 1000 using multi-power of FIG. 15 may optionally include the communication unit switch SW2 1620 at the front end of the communication unit power unit 1250, the controller switch SW3 1630 at the front end of the controller power unit 1150, and a seventh switch SW7 1670 at the front end of the output interface power unit 1350. The first capacitor 1270 and the second capacitor 1170 are connected by a first diode D1 1601, and the third capacitor 1370 and the second capacitor 1170 are connected by a sixth diode D6 1661.

In an embodiment of the disclosure, in order to quickly stabilize the power of the communication unit, or interface, 1200, the cooking device 1000 turns off the controller switch SW3 1630 and the seventh switch SW7 1670 and turn on the communication unit switch SW2 1620 only, thereby stabilizing the power of the communication unit, or interface, 1200. The cooking device 1000 turns the controller switch SW3 1630 on to stabilize the power of the controller 1100, based on the stabilization of the power of the communication unit, or interface, 1200. Next, the cooking device 1000 may stabilize the power of the output interface 1300 by turning the seventh switch SW7 1670 on, based on the stabilization of the power of the controller 1100.

According to an embodiment of the disclosure, as describe above in FIG. 13, through the first diode D1 1601 that connects the second capacitor 1170 to the first capacitor 1270, when the power of the output interface 1300 is established (power stabilization), the power established in the second capacitor 1170 may be shared and used not only by the controller 1100, but also by the communication unit, or interface, 1200. At this time, as the second capacitor 1170 and the first capacitor 1270 are connected by a diode, after the power of the controller 1100 is stabilized, the cooking device 1000 turns the communication unit switch SW2 1620 off to stop driving of the communication unit power unit 1250, thereby preventing power consumption of the communication unit power unit 1250, and the communication unit, or interface, 1200 may be driven by using power by the second capacitor 1170 only.

According to an embodiment, after the power stabilization of the output interface 1300, through the sixth diode D6 1661 and the first diode D1 1601, the controller 1100 and the communication unit, or interface, 1200 may share and use power by the third capacitor 1370. When the power stabilization of the output interface 1300 is established, the cooking device 1000 turns the communication unit switch SW2 1620 off to break the connection between the communication unit power unit 1250 and the rectification unit 1500. Furthermore, the cooking device 1000 may break the connection between the controller power unit 1150 and the rectification unit 1500 by turning the controller switch SW3 1630 off. By turning the communication unit switch SW2 1620 and the controller switch SW3 1630 off, the cooking device 1000 may enable total power supply to the communication unit, or interface, 1200, the controller 1100, and the output interface 1300, which are major components of the cooking device 1000, through the connection of the third capacitor 1370, the sixth diode D6 1661, and the first diode D1 1601, without power consumption in the communication unit power unit 1250 and the controller power unit 1150.

Figure 16:
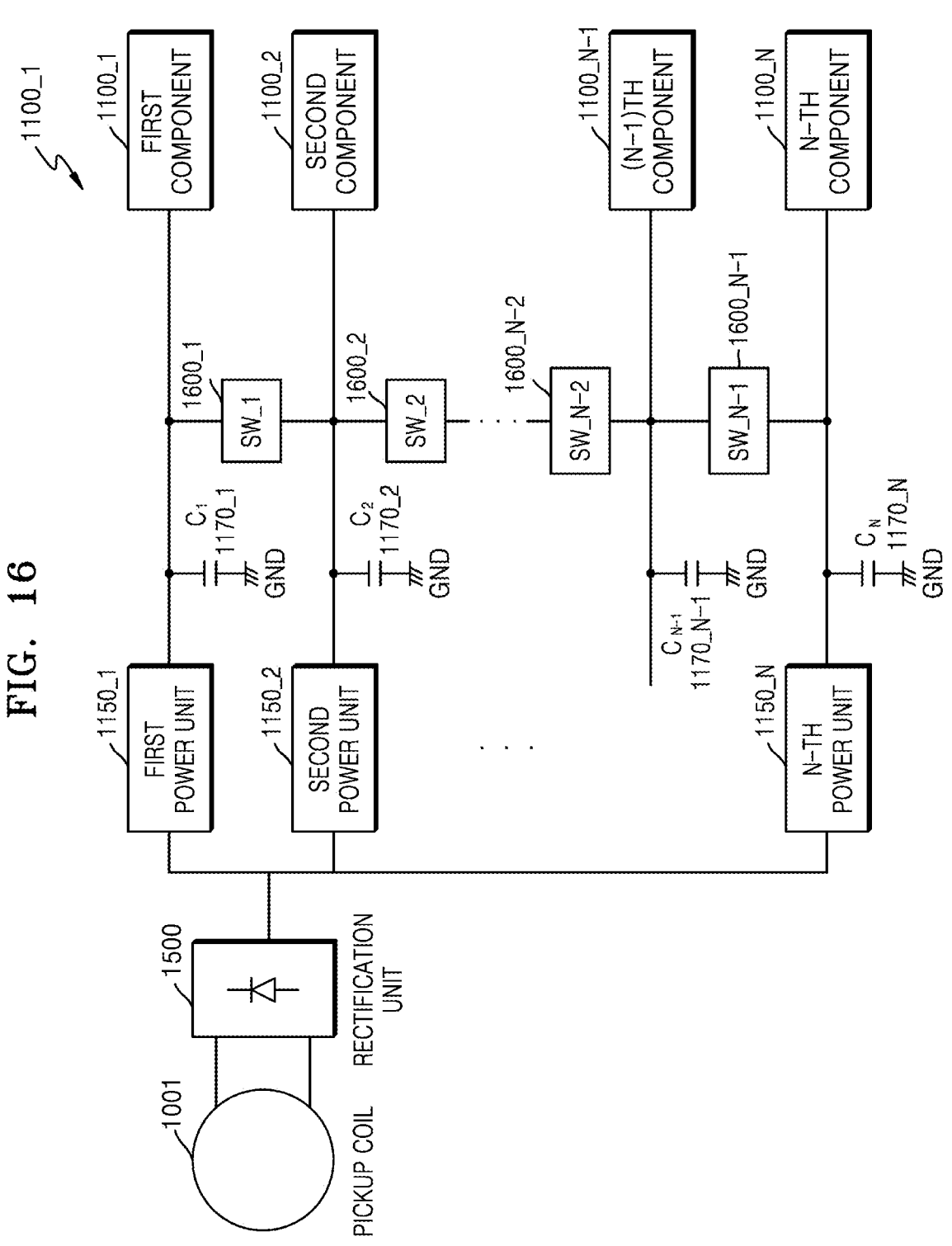
FIG. 16 is a circuit diagram of a cooking device using multi-power according to an embodiment of the disclosure.

FIG. 16 is a circuit diagram of a cooking device using multi-power according to an embodiment of the disclosure.

According to an embodiment of the disclosure, although the communication unit, or interface, 1200, the controller 1100 and the output interface 1300 are exemplarily used as components of the cooking device 1000 according to FIGS. 6 to 15, this is merely an example, and the cooking device 1000 using multi-power according to the disclosure may be used for an application in which the power of a component that uses the least power capacitance and needs power stabilization first is stabilized as a top priority, and the power of a component that needs a large power capacitance and is not affected in an operation when the power stabilization is accomplished with a delay in time compared with other components is stabilized later. Accordingly, as the communication unit, or interface, 1200, the controller 1100, and the output interface 1300 are merely used for an embodiment, as illustrated in FIG. 16, the communication unit, or interface, 1200 may be replaced with a first component 1100_1 having the least power capacitance, and the controller 1100 may be replaced with a second component 1100_2 having a power capacitance greater than the first component 1100_1.

In FIG. 16, an N-th component 1100_N is illustrated as a component that has the largest power capacitance and the power thereof is stabilized latest. Similar to the above-described embodiments, capacitance size order is that $C_1 < C_2 < \ldots < CN-1 < CN$.

According to an embodiment, when the power of the second component 1100_2 that is a component having relatively larger power capacitance than the first component 1100_1 is stabilized, the first component 1100_1 may share and use the power of $C_2$ 1170_2 that is a power supply source of the second component 1100_2 by SW_1 1600_1.

Likewise, when the N-th component 1100_N having the largest power capacitance is stabilized, an SW_N−1 1600_N−1 is turned on, so that power may be supplied even to an N-th−1 component 1100_N−1. Furthermore, in an embodiment, when the N-th component 1100_N having the largest power capacitance is stabilized, the SW_1 1600_1 to the SW_N−1 1600_N−1 are all turned on so that power may be supplied even to the first component 1100_1 to the N-th−1 component 1100_N−1.

Alternatively, according to an embodiment, after the N-th component 1100_N is stabilized, the cooking device 1000 may determine how many switches from the SW_N−1 1600_N−1 are turned on depending on the capacitance of a $C_N$ 1170_N. In other words, when the capacitance of the $C_N$ 1170_N is large enough to supply power to the N-th component 1100_N and the N-th−1 component 1100_N−1 only, the cooking device 1000 may turn on the SW_N−1 1600_N−1 only and turn off the other SW_11600_1 to the SW_N−2 1600_N−2. The power capacitance used by each of components may be calculated by sensing a voltage at both ends of a capacitor for supplying power to each component and a current input to each component.

In FIG. 16, the opening/closing control of each switch is performed by a processor or a micro controller included in a component having established power.

As described above, in FIGS. 6 to 15, the opening/closing of each switch may be controlled by the processor 1110 of the controller 1100 of the cooking device 1000, and when the power stabilization of the controller 1100 is not accomplished, the processor 1210 of the communication unit, or interface, 1200 may control the opening/closing of each switch, but the disclose is not limited thereto, and as necessary, the opening/closing of each switch may be performed by a processor or a controller included in a component having established power in the cooking device 1000.

Figure 17:
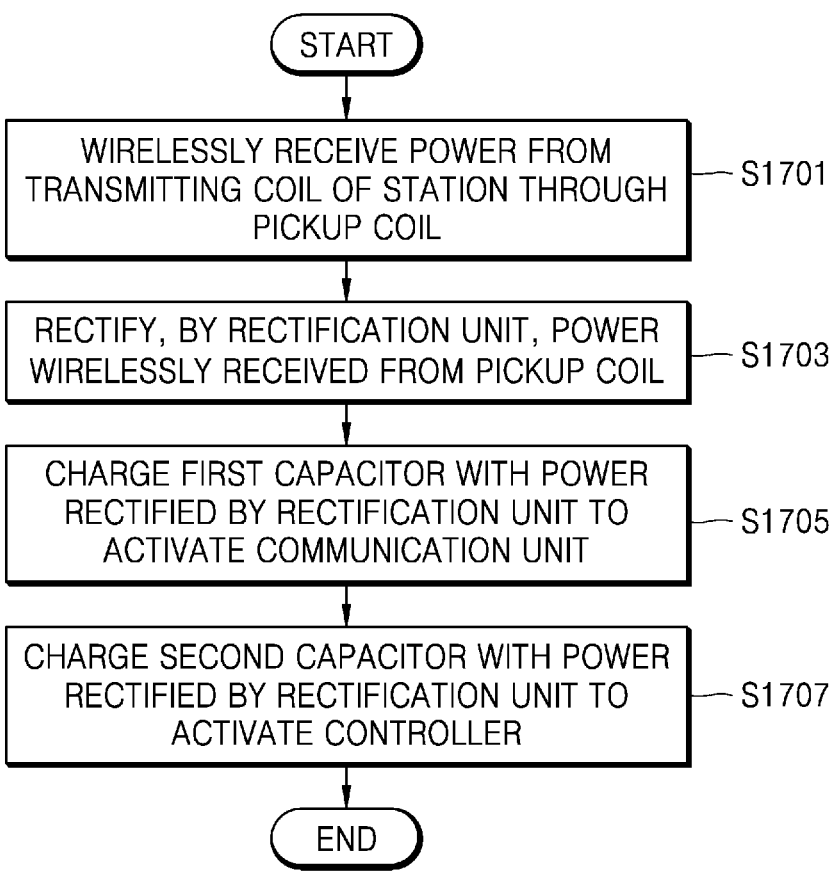
FIG. 17 is a flowchart of a method of driving a cooking device using multi-power, according to an embodiment of the disclosure.

FIG. 17 is a flowchart of a method of driving the cooking device 1000 using multi-power according to an embodiment of the disclosure.

In operation S1701, the cooking device 1000 wirelessly receive power from the transmitting coil of the station 2000 through the pickup coil 1001. The flowing of an induction current in the pickup coil 1001 by a magnetic field generated in the transmitting coil of the station 2000 may be expressed as the pickup coil 1001 receiving wireless power from the transmitting coil. According to an embodiment of the disclosure, the pickup coil 1001 may have a concentric shape or an oval shape, but the disclosure is not limited thereto.

In operation S1703, the rectification unit 1500 of the cooking device 1000 rectifies the power wirelessly received from the pickup coil 1001. In an embodiment, the rectification unit 1500 may use a single-phase diode rectifier.

In operation S1705, the cooking device 1000 charges the first capacitor 1270 with the power rectified by the rectification unit 1500 to activate the communication unit, or interface, 1200. The communication unit, or interface, 1200 may store in the communication unit memory 1220 pieces of data to communicate with the station 2000, for example, identification information of the cooking device 1000, a welcome message when the cooking device 1000 is first turned on, status information, and the like. The identification information of the cooking device 1000 may include, as unique information to identify the cooking device 1000, a Mac address, a model name, device-type information, for example, an IH type or a heater type, manufacturer information, for example, manufacture ID, a serial number, or a date of manufacture (or year, month, and date of manufacture). When the communication unit, or interface, 1200 is activated, the communication unit, or interface, 1200 transmits such data to the station 2000 to be displayed through the display unit 2510 of the station 2000.

In operation S1707, the cooking device 1000 charges the second capacitor 1170 with the power rectified by the rectification unit 1500 to activate the controller 1100. According to an embodiment, the capacitance of the second capacitor 1170 is characteristically greater than the capacitance of the first capacitor 1270.

According to an embodiment of the disclosure, a method is implemented in the form of a program command to be executed through various computer devices and may be recorded on a computer-readable medium. The computer-readable medium may include a program command, a data file, a data structure, etc. solely or by combining the same. A program command recorded on the medium may be specially designed and configured for the disclosure or may be a usable one, such as computer software, which is well known to one of ordinary skill in the art to which the disclosure pertains to. A computer-readable recording medium may include magnetic media such as hard discs, floppy discs, and magnetic tapes, optical media such as CD-ROM or DVD, magneto-optical media such as floptical disks, and hardware devices such as ROM, RAM flash memory, which are specially configured to store and execute a program command. An example of a program command may include not only machine codes created by a compiler, but also high-level programming language executable by a computer using an interpreter.

The embodiments of the disclosure may be embodied in the form of a recording medium including computer executable instructions, such as a program module executed by a computer. A computer-readable storage medium may be a useable medium that is accessible by a computer and may include all of volatile and non-volatile media and separable and inseparable media. Furthermore, the computer-readable medium may include all of computer storage media and communication media. A computer-readable storage medium may be a useable medium that is accessible by a computer and may include all of volatile and non-volatile media and separable and inseparable media. The communication media may typically include computer-readable instructions, data structures, program modules, or other data of a modulated data signal such as a carrier wave, or other transmission mechanism, and may also include information transmission media. Furthermore, some embodiments of the disclosure may also be implemented as a computer program or computer program product containing instructions executable by a computer, such as a computer program executed by a computer.

A device-readable storage medium may be provided in the form of a non-transitory storage medium. The non-transitory may mean that a storage medium is a tangible device, not including a signal, for example, an electromagnetic wave. However, the term does not distinguish a case of semi-permanently storing data in a storage medium from a case of temporarily storing data. For example, a non-transitory storage medium may include a buffer for temporarily storing data.

According to an embodiment, a method according to various embodiments disclosed in the present document may be provided by being included in a computer program product. A computer program product as goods may be dealt between a seller and a buyer. A computer program product may be distributed in the form of a device-readable storage medium (e.g., a compact disc read only memory (CD-ROM)), or through an application store or directly online (e.g., download or upload) between two user devices (e.g., smartphones). For online distribution, at least part of a computer program product (e.g., a downloadable application) may be at least temporarily stored or generated on a device-readable storage medium such as a manufacturer's server, a server of the application store, or a memory of a relay server.

What is claimed is:

1. A cooking device comprising:
a controller including at least one processor and a memory, the controller configured to, after being activated, control an operation of the cooking device;
a communication unit including a communication interface circuit, the communication unit configured to, after being activated, transmit data to a wireless power transmission device;
a pickup coil configured to wirelessly receive power from a transmitting coil of the wireless power transmission device;
a rectification circuit including a plurality of rectifying devices, the rectification circuit configured to rectify an alternating current (AC) of the pickup coil corresponding to the power received by the pickup coil, to produce a direct current (DC);
a first capacitor configured to be charged in accordance with the DC current produced by the rectification circuit to activate the communication unit before an activation of the controller; and
a second capacitor, having a capacitance greater than a capacitance of the first capacitor, configured to be charged in accordance with the DC current produced by the rectification circuit to activate the controller,
wherein the communication unit transmits the data to the wireless power transmission device before the activation of the controller.

2. The cooking device of claim 1, further comprising a switch connecting the first capacitor to the second capacitor.

3. The cooking device of claim 2, wherein:
the switch includes a diode,
the second capacitor has a positive pole connected to an anode of the diode, and
the first capacitor has a positive pole connected to a cathode of the diode.

4. The cooking device of claim 2, wherein:
the switch includes a transistor,
the second capacitor has a positive pole connected to a collector of the transistor, and
the first capacitor has a positive pole connected to an emitter of the transistor.

5. The cooking device of claim 4, wherein the controller is configured to turn the transistor on after a predetermined time period passes after wirelessly receiving power through the pickup coil.

6. The cooking device of claim 5, wherein the time period is a time duration to complete charging of the second capacitor.

7. The cooking device of claim 5, wherein, after the time period passes, the controller turns off a switch connected between the rectification circuit and the first capacitor.

8. The cooking device of claim 1, wherein the controller is configured to control turning on/off of a switch connecting the rectification circuit and the first capacitor, depending on a charge level of the second capacitor.

9. The cooking device of claim 1, wherein the communication unit is configured to transmit the data to the wireless power transmission device when a charge level of the first capacitor is equal to or greater than a value, based on the activation of the communication unit.

10. The cooking device of claim 9, wherein
the data includes at least one of identification information of the cooking device, a welcome message when the cooking device is turned on, or status information of the cooking device, and the identification information of the cooking device includes at least one of a Mac address, a model name, type information, manufacturer information, a serial number, or a date of manufacture of the cooking device.

11. The cooking device of claim 1, further comprising a switch connecting the rectification circuit to the second capacitor that is turned off until the activation of the communication unit is complete.

12. The cooking device of claim 11, wherein the switch connecting the rectification circuit to the second capacitor is turned on based on completion of the activation of the communication unit.

13. The cooking device of claim 1, further comprising an output interface configured to use power from the second capacitor.

14. The cooking device of claim 1, further comprising:
an output interface configured to display information; and
a third capacitor configured to charge power from the rectification circuit to activate the output interface, wherein a capacitance of the third capacitor is greater than the capacitance of the second capacitor.

15. The cooking device of claim 14, further comprising a switch connecting the second capacitor to the third capacitor.

16. The cooking device of claim 15, further comprising:
a switch connecting the first capacitor to the second capacitor that is turned on as the controller is activated, wherein the switch connecting the second capacitor to the third capacitor is turned on as the output interface is activated.

17. The cooking device of claim 16, further comprising:
a switch connecting the first capacitor to the rectification circuit that is turned off based on turning on of the switch connecting the first capacitor to the second capacitor, and
a switch connecting the second capacitor to the rectification circuit that is turned off based on turning-on of the switch connecting the second capacitor to the third capacitor.

18. The cooking device of claim 17, wherein:
when a voltage at both ends of the third capacitor is less than or equal to a value, the switch connecting the second capacitor to the rectification circuit is turned on and,
when a voltage at both ends of the second capacitor is less than or equal to a value, the switch connecting the first capacitor to the rectification circuit is turned on.

19. The cooking device of claim 1, wherein the cooking device:
is heated by an eddy current generated in the cooking device by magnetic induction of the wireless power transmission device, or
is heated by a receiving coil configured to wirelessly receive power from the transmitting coil of the wireless power transmission device.

20. The cooking device of claim 1, further comprising a temperature sensor configured to sense a temperature of contents in the cooking device.

* * * * *